(12) United States Patent
Dushine et al.

(10) Patent No.: US 10,220,361 B1
(45) Date of Patent: Mar. 5, 2019

(54) MAGNETIC STIRRING SYSTEM FOR THE AUTOMATED AND OPTIMIZED RECONSTITUTION OF POWDERED INFANT FORMULATIONS AND METHODS OF USING SAME

(71) Applicants: Boris Dushine, Highland Beach, FL (US); Annya Dushine, Boca Raton, FL (US)

(72) Inventors: Boris Dushine, Highland Beach, FL (US); Annya Dushine, Boca Raton, FL (US)

( * ) Notice: Subject to any disclaimer, the term of this patent is extended or adjusted under 35 U.S.C. 154(b) by 0 days.

(21) Appl. No.: 16/054,256

(22) Filed: Aug. 3, 2018

(51) Int. Cl.
| B01F 13/08 | (2006.01) |
| B01F 15/00 | (2006.01) |
| B01F 1/00 | (2006.01) |
| A23L 33/00 | (2016.01) |

(52) U.S. Cl.
CPC ........ B01F 13/0854 (2013.01); B01F 1/0011 (2013.01); B01F 15/00389 (2013.01); *A23L 33/40* (2016.08); *A23V 2002/00* (2013.01); *B01F 2215/0014* (2013.01)

(58) Field of Classification Search
CPC .................. B01F 13/0818; B01F 13/0845
USPC .................................................. 366/273, 274
See application file for complete search history.

(56) References Cited

U.S. PATENT DOCUMENTS

| 2,546,949 A | 3/1951 | Morrison, Jr. |
| 2,549,121 A | 4/1951 | Osterheld |
| 3,172,645 A | 3/1965 | Price, Jr. |
| 4,498,785 A | 2/1985 | De Bruyne |
| 5,797,313 A | 8/1998 | Rothley |
| 6,332,706 B1 | 12/2001 | Hall |
| 7,629,167 B2 | 12/2009 | Hodge et al. |
| 8,057,092 B2 | 11/2011 | Ryan et al. |
| 8,282,268 B2 | 10/2012 | Karkos, Jr. et al. |
| 8,480,292 B2 | 7/2013 | Dushine et al. |
| 9,751,054 B2 | 9/2017 | Jin et al. |
| 9,815,035 B2 | 11/2017 | Werth et al. |
| 9,873,097 B1 | 1/2018 | Dushine et al. |
| 9,873,858 B2 | 1/2018 | Boddenberg |
| 2006/0172041 A1 | 8/2006 | Farrell |
| 2008/0131957 A1 | 6/2008 | Ryan et al. |
| 2010/0020634 A1 | 1/2010 | Kosmoski et al. |
| 2010/0046323 A1* | 2/2010 | Tien .................... B01F 13/0818 366/274 |
| 2011/0293807 A1 | 12/2011 | Dushine et al. |
| 2012/0002501 A1 | 1/2012 | Ulstad et al. |
| 2014/0263461 A1 | 9/2014 | Prokop |
| 2014/0308416 A1 | 10/2014 | Cheng |
| 2015/0314253 A1 | 11/2015 | Cysewski et al. |
| 2015/0329809 A1 | 11/2015 | Cifaldi |
| 2016/0114300 A1 | 4/2016 | Pagliaro et al. |
| 2016/0244710 A1 | 4/2016 | Wood et al. |
| 2016/0339398 A1 | 11/2016 | Stevenson et al. |

* cited by examiner

*Primary Examiner* — David L Sorkin
(74) *Attorney, Agent, or Firm* — Chalin A. Smith; Smith Patent LLC

(57) ABSTRACT

A system and method for automatically preparing infant feed formulation from powdered infant formulae is herein disclosed. The system of the present invention is specifically designed to achieve consistent homogeneous reconstitution of the powdered material, maximizing efficient solubilization while minimizing negative side effects such as oxidation, foaming, and protein denaturation.

32 Claims, 16 Drawing Sheets

SECTION A-A

SECTION A-A

| | X-AXSIS | | | Y-AXSIS | |
|---|---|---|---|---|---|
| NO. | Θ (IN DEGREES) | TIME (IN MINUTES) | SIN Θ | V MOTOR (IN VOLTS) | RPM MOTOR |
| 0 | 0 | 0.00 | 0.00 | 0.00 | 0 |
| 1 | 15 | 0.25 | 0.26 | 1.56 | 280 |
| 2 | 30 | 0.50 | 0.50 | 3.00 | 375 |
| 3 | 45 | 0.75 | 0.71 | 4.26 | 470 |
| 4 | 60 | 1.00 | 0.87 | 5.22 | 540 |
| 5 | 75 | 1.25 | 0.97 | 5.82 | 612 |
| 6 | 90 | 1.50 | 1.00 | 6.00 | 650 |
| 7 | 105 | 1.75 | 0.97 | 5.82 | 612 |
| 8 | 120 | 2.00 | 0.87 | 5.22 | 540 |
| 9 | 135 | 2.25 | 0.71 | 4.26 | 470 |
| 10 | 150 | 2.50 | 0.50 | 3.00 | 375 |
| 11 | 165 | 2.75 | 0.26 | 1.56 | 280 |
| 12 | 180 | 3.00 | 0.00 | 0.00 | 0 |

MAGNETIC STIRRING SYSTEM FOR THE AUTOMATED AND OPTIMIZED RECONSTITUTION OF POWDERED INFANT FORMULATIONS AND METHODS OF USING SAME

FIELD OF THE INVENTION

The present invention relates broadly and generally to the field of magnetic stirrers or mixers suitable for home consumer use, as exemplified by U.S. Pat. No. 8,480,292 (issued Jul. 9, 2013 to Dushine et al.) and U.S. Pat. No. 9,873,097 (issued Jan. 23, 2018 to Dushine et al.), the contents of which are incorporated by reference in their entirety. More particularly, the present invention relates an automated system for optimizing the preparation of infant feed formulations from powdered infant formulae.

BACKGROUND

Infant formula was designed for use as a substitute for human milk when mothers are unable to breast feed their babies. Commercially available infant formulae tend to be presented in either a sterilized liquid form (ready-to-feed (RTF)) or in a powder form. While liquid infant formulae are more convenient to use and can avoid errors in the reconstitution of powdered formulae, the price is significantly higher. As such, most families opt for powdered infant formulae that, in addition to being less expensive, are much easier to transport and store. However, as a general rule, powdered infant formula is not a sterile product. Accordingly, parents and caregivers are advised to follow precise handling, preparation, and storage guidelines to reduce the risk of illness and ensure healthy consumption.

While precise instructions vary from one manufacturer to the next and from one formulation to the next, formula feed preparation generally involves adding a select amount of powdered infant formula to a corresponding amount of optionally pre-sterilized water, either directly in a sterilized baby bottle or in a large storage container, and mixing, stirring and/or agitating until thoroughly combined. Both manufacturers and pediatricians emphasize the criticality of proper mixing. For example, excess shaking and blending tends to introduce air bubbles into the formulation that, in turn, can lead to painful gas if/when ingested by the infant. Aggressive agitation can also damage or denature delicate essential nutrients and proteins and thus undermine the nutritional value of the resulting formulation. On the flip side, incomplete mixing can also yield an infant formulation of inadequate nutritional value. Thus, a careful balance is critical. However, as many parents can attest, achieving consistent homogenous reconstitution of the powdered material is nearly impossible through manual methods (e.g., hand shaking, swirling and/or stirring). Thus, there is a need in the art for an apparatus, system, and method for automating the preparation of a reconstituted infant feed formulation from powdered infant formulae.

SUMMARY OF THE INVENTION

Further to the above-noted need in the art, it is accordingly an objective of the present invention to provide a magnetic stirring system for the automated preparation of an infant feed formulation reconstituted from powdered formula that overcomes the drawbacks of existing manual and automatic infant feed preparation systems and methods. As discussed in greater detail hereinbelow, the magnetic stirring system of the present invention is designed to optimize solubility while reducing and/or eliminating the damaging effects of foaming, denaturation, and oxidation of the reconstituted infant formulation.

To that end, it is an objective of the present invention to provide an integrated magnetic stirring assembly for the reconstitution of powdered infant formulations, the assembly including:
a. a vessel having an upper portion that includes an open spout in communication with a hollow interior, an intermediate body portion that defines a longitudinal axis, and a lower base portion characterized by a relatively flat or planar stable bottom surface;
b. a magnetic stirring impeller retained within the hollow interior of the vessel, at or near the bottom surface, characterized by:
  i. an annular support section,
  ii. a plurality of transversely-extending blades radiating out from the support section, and
  iii. two opposed, laterally spaced magnet components that together define a first vertical summed magnetic field vector, wherein the magnet components are symmetrically arranged about the annular support section and fabricated of magnetic, paramagnetic or ferromagnetic material;
wherein the diameter of magnetic stirring impeller is slightly smaller than the diameter of the vessel measured at said bottom surface,
further wherein said magnetic stirring impeller is introduced into the hollow interior via said open spout and subsequently centered about the bottom surface of said vessel such that said plurality of component(s) can freely spin within said lower base portion section without contacting any surface of said vessel.

In particularly preferred embodiments, the magnetic stirring impeller has a relatively flat, planar profile and relatively circular periphery and includes:
a central ring or annular component that acts to "seat" the impeller at the center of the base of the vessel;
a plurality of transversely-extending, vertical, horizontal or pitched blades radiating from the center ring configured to generate the requisite gentle agitation for optimal powdered infant formulation (PIF) reconstitution; and
at least one concentric outer ring that serves to both stabilize and rigidify the impeller, particularly the blades, and to protect against breakage, warping and torsional deflection.

It is a further objective of the present invention to provide an automated magnetic mixing system for reconstituting powdered infant formulations, the system including the integrated magnetic stirring assembly described above, coupled with a magnetic stir plate, wherein the magnetic stir plate includes:
a. a housing containing a DC motor driven by a DC power source via an associated power transistor, wherein the DC motor drives a horizontally disposed rotor bar and is activated by an actuator mechanism disposed on the exterior of the housing;
b. a PC board integrated with the housing that includes a pre-programmed microcontroller for regulating the acceleration and deceleration of the DC motor in response to the actuator mechanism;
c. a pair of coupling magnets of opposite polarity attached to said rotor bar, wherein activation of the motor causes the coupling magnets to rotate in a horizontal plan and define a second vertical summed magnetic field vector; and d. one or more optional recessed positioning elements disposed about the periphery of the top surface of said housing that are sized to mate with the base of the stirring vessel and align the center of the stirring impeller with the center of the stir plate and thus align the coupling magnets with the impeller magnets, such that the first vertical summed magnetic field vector overlaps with the second vertical summed magnetic field vector.

It is a further objective of the present invention to provide one or more predetermined mixing profiles in which acceleration and deceleration are carefully monitored and controlled, powered by a DC motor that drives the integrated magnetic stirring system to achieve consistent homogenous reconstitution of powdered infant formula. This automated control system offers improved dissolution while reducing or eliminating undesirable foaming, oxygenation, and/or denaturation over a manual speed adjustment control, provided that operating parameters are carefully optimized. To that end, one simple and easy way to control the speed of a motor is to regulate the amount of voltage across its terminals and this can be achieved using "Pulse Width Modulation" or PWM. This PWM signal is generated by the microcontroller and in charge of the acceleration and deceleration profiles computation. The algorithm of this nature presented in this invention determines the acceleration/deceleration profile. The rate profile employed may be a sine function, such as represented by FIG. 8A, though the invention is not necessarily limited thereto as other shapes and profiles, both symmetric and asymmetric, are contemplated. In the context of the present invention, symmetric profiles are particularly preferred. Accordingly, a sine acceleration ramp or wind-up motor speed rate may be built into the controller to dramatically reduce decoupling of the impeller when compared to a traditional manual rotational knob control. The present invention also contemplates a controlled deceleration ramp. Fluid dynamists have long observed that orbital stirring generates a wave that propagates around the inner edge of a container, churning the liquid as it travels. The formation of waves begins to break, turning frothy, if the waves are moving too quickly and abruptly stop. Accordingly, a deceleration ramp is preferably included in the control program of the present invention to allow any generated froth to subside before serving.

The objectives, aspects and features of the invention discussed herein above will become more fully apparent when the following detailed description is read in conjunction with the accompanying figures and/or examples. However, it is to be understood that both the foregoing summary of the invention and the following detailed description are of preferred embodiments and not restrictive of the invention or other alternate embodiments of the invention. Various modifications and applications may occur to those who are skilled in the art, without departing from the spirit and the scope of the invention, as described by the appended claims. Likewise, other objectives, features, benefits and advantages of the present invention will be apparent from this summary and certain embodiments described below, and will be readily apparent to those skilled in the art having knowledge in the magnetic mixing arts. Such objectives, features, benefits and advantages apparent from the above in conjunction with the accompanying examples, data, figures and all reasonable inferences to be drawn there-from are specifically incorporated herein.

BRIEF DESCRIPTION OF THE FIGURES

The above-mentioned features and objects, as well as various additional aspects and applications of the present invention, will become apparent to the skilled artisan upon consideration of the detailed description of the present invention and its preferred embodiments that follows, as well as the illustrative figures that accompany this application, wherein like reference numerals denote like elements.

DETAILED DESCRIPTION OF THE PREFERRED EMBODIMENTS

Figure 1:
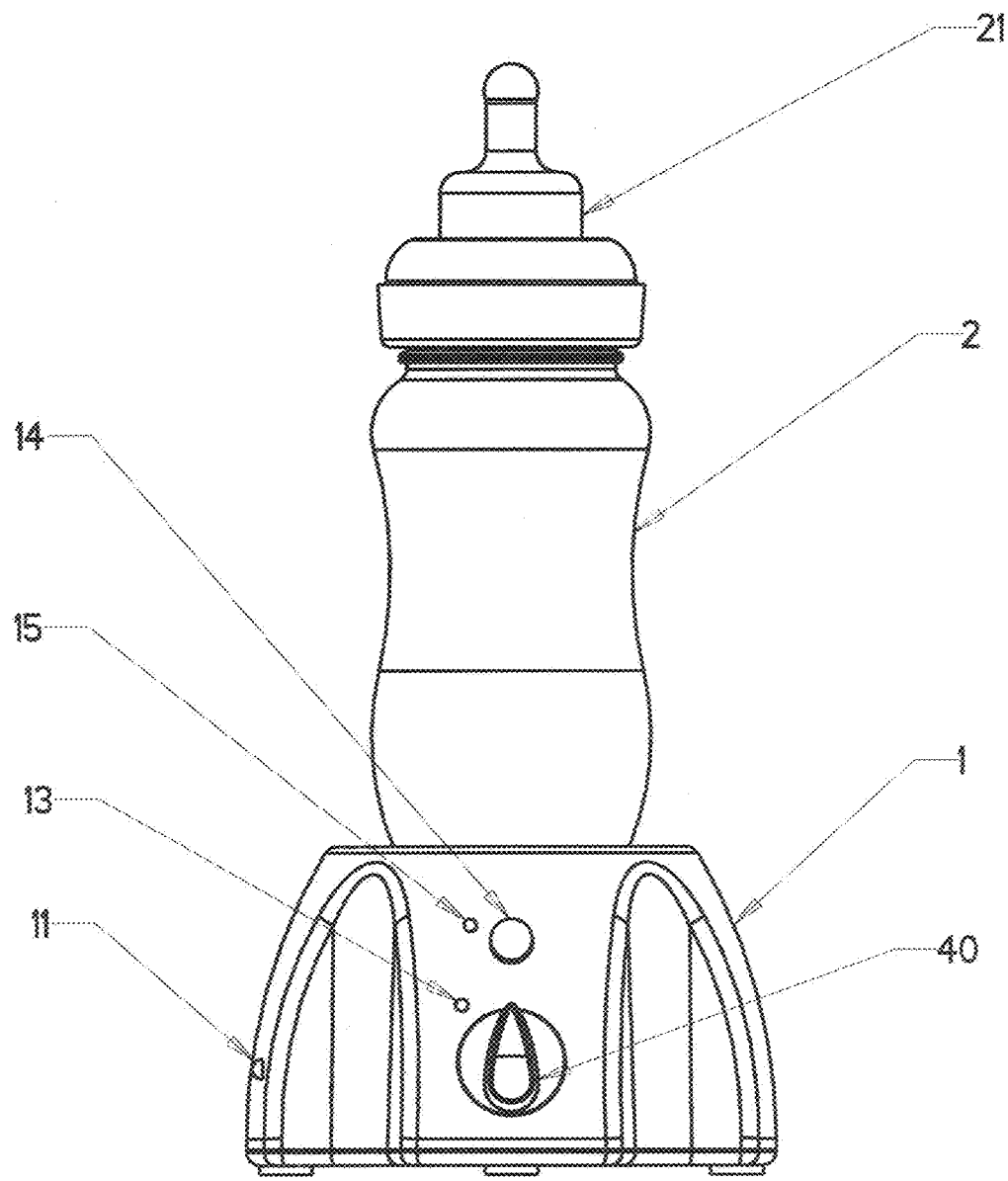
FIG. 1 is a front view of an illustrative embodiment of a magnetic stirring system of the present invention, namely a standard glass baby bottle coupled to the magnetic stirring base unit.

The present invention is more fully described hereafter with reference to the accompanying drawings, in which one or more exemplary embodiments of the present invention are shown. However, while construction and utilization of the present invention is best understood through the following text and associated figures, it is to be understood that the invention is not limited to the particular embodiments, materials, methodologies or protocols herein described, as these may vary in accordance with routine experimentation and optimization. Many such adaptations, variations, modifications, and equivalent arrangements are contemplated and thus implicitly disclosed by the embodiments described and fall within the scope of the present invention.

Herein, the terms "comprises", "comprising", "includes", "including", "has", "having", and variations thereof are intended to cover a non-exclusive inclusion. For example, a method, article, or apparatus that "comprises" a list of features is not necessarily limited only to those features and thus may include others not expressly listed and/or inherent to such method, article, or apparatus.

In a similar fashion, the words "a", "an", and "the" as used herein mean "at least one" unless otherwise specifically indicated. Where only one item is intended, the term "one", "single" or similar language is used. Likewise, when used to join a list of items, the term "or" denotes at least one of the items, but does not exclude a plurality of items of the list.

Unless otherwise defined, all technical and scientific terms used herein have the same meaning as commonly understood by one of ordinary skill in the relevant art, such as fluid mechanics and magnetism. To the extent not described herein, many details regarding specific materials and processing acts are conventional and may be found in textbooks and other general teaching sources. It is to be understood that although specific terms are employed herein for the purpose of describing particular illustrative embodiments, they are used in a generic and descriptive sense only and not for the purpose of limitation and are intended to limit the scope of the present invention, which will be limited only by the appended claims. Accordingly, unless otherwise expressly defined, such terms are to be afforded their broad ordinary and customary meaning, as commonly understood by one of ordinary skill in the art and not inconsistent with that applicable to the relevant industry and without restriction to any specific embodiment hereinafter described. In case of conflict, the present specification, including following definitions, will control. Accordingly:

In the context of the present invention, the term "proximal" is used to refer to an end, portion, or direction that is situated closest to or points to the user. In contrast, the term "distal" is used to refer to that end, portion, or direction that is situated farthest away or points away from the user.

In the context of the present invention, the terms "axial" and "longitudinal" are used to refer to travel along a long axis of a component, i.e., a lengthwise direction or dimension. In contrast, the term "lateral" is used herein to refer to travel perpendicular or transverse to a long axis of the component, i.e., a side-to-side direction or dimension.

In the context of the present invention, the terms "annulus" and "annular" refer to structures having a cylindrical or ring-like shape.

In the context of the present invention, the term "radial" is used to refer to the direction that extends outward from the center of an annular, circular or tubular structure or inward from the circumference inward along a radius.

In the context of the present invention, the term "groove" is used herein to refer to a long, narrow concave furrow or channel bordered by one or more corresponding projecting (i.e., convex) "ribs", "ridges" or "flanges" disposed about the periphery of the vessel.

Within the practice of the present invention, the phrase "powdered infant formula(e)" or "PIF" refers to a dry or dehydrated form of a manufactured food formulated for the dietary needs of babies and infants under 12 months of age that is designed to be reconstituted or mixed with a liquid (typically water) to yield a "liquid formulation" (or "feed formulation") for bottle-feeding or cup-feeding that simulates human milk and is suitable as a complete or partial substitute for human milk.

In the context of the present invention, the magnetic stirring system of the present invention for the automated preparation of reconstituted infant formulations from powdered material is at times referred to as simply as a "powdered formula mixer". Both terms are intended to encompass any device that includes a fully integrated magnetic stir plate and vessel with a dedicated impeller and speed control system, which is used to reconstitute powdered infant formula into a liquid formulation suitable for infant consumption.

Figures 8A, 8B:
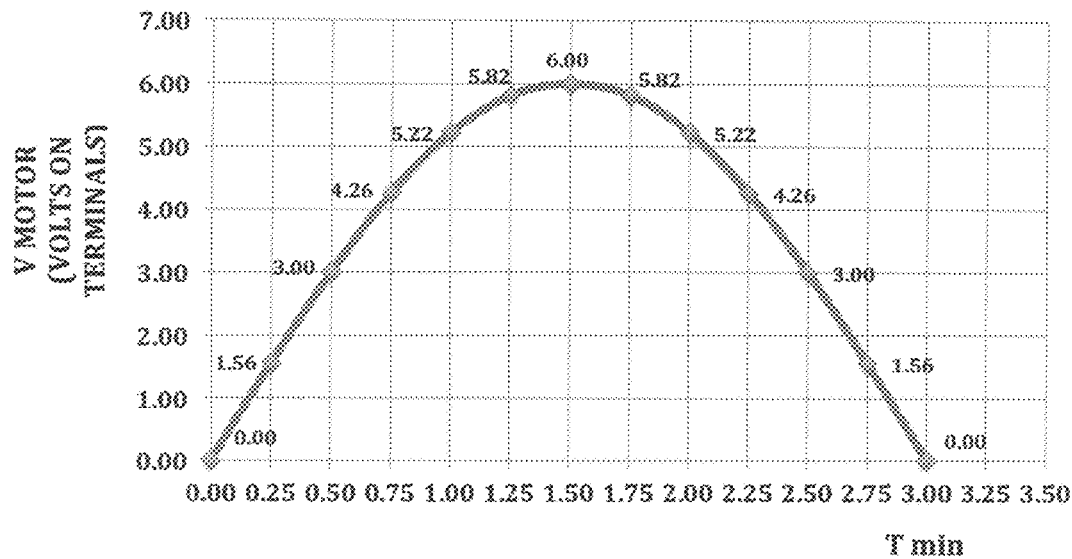
FIG. 8A is a diagram of an illustrative acceleration/deceleration control profile that may be programmed into the microcontroller of a magnetic stirring system of the present invention.
FIG. 8B presents the values plotted in FIG. 8A in table form.

Within the practice of the present invention, the phrases "stir plate" and "magnetic stir plate" are alternatively used herein to refer to a magnetic stirrer that employs a rotating magnetic field to cause a magnetic stirring impeller associated therewith to spin very quickly within a vessel for the purpose of mixing baby formula. The magnetic stir plate of the present invention is capable of providing mixing speeds from zero revolutions per minute (rpm) to a maximum speed 2400 rpm. However, in a preferred embodiment, such as represented by FIG. 8A, the profile gradually increases from zero to a maximum of 650 rpm and again gradually back to zero over a three minute period.

Within the practice of the present invention "coupling magnets" refers to two magnets within the magnetic stir plate that drive the magnetic stirring impeller via magnetic coupling.

Within the practice of the present invention "coupling" or "magnetic coupling" refers to an overlapping magnetic force between the magnetic stir plate's coupling magnets and the magnetic mixing impeller's magnets.

Within the practice of the present invention "decoupling" refers to breaking the magnetic coupling force between the magnetic stir plate's coupling magnets and magnetic stirring impeller.

Within the practice of the present invention terms "vessel" and "stirring vessel" are used interchangeably to refer to the container in which the powdered infant formula or PIF is reconstituted. In the context of the present invention, the vessel may take the form of a standard baby bottle (see, e.g., FIGS. 1 and 2) designed for direct feeding or a larger vessel designed to store larger quantities of reconstituted formula that may be dispensed into individual bottles as needed (see, e.g., FIGS. 4A and 4B). To ensure stable and secure alignment of vessel and stir plate, the magnetic stirring system of the present invention may optionally be provided with one or more positioning components, such as integral recess grooves and/or snap-in adapters sized to coordinate and/or mate with the outer diameter of a corresponding vessel. In this manner, the magnetic stir plate may be adapted to accommodate any standard sized, commercially available baby bottle, from 180 ml to 240 ml to 300 ml, as well as larger storage vessels (e.g., up to 24 ounces).

In the context of the present invention, both the baby bottle and the storage vessel are preferably made from a material that is heat and thermal shock resistant so that each can be safely stored in a refrigerator and warmed as needed. It is further desirable to utilize a material that may be easily washed and sterilize. Thus, in the context of the present invention, the storage vessel is preferably made from a polycarbonate plastic or BPA-free glass whereas suitable baby bottles are preferably fabricated from a premium quality BPA-free borosilicate glass that has a smooth surface and high transparency. Use of a super light food grade glass bottle is further preferred because it can reduce milk stand as compared to conventional glass. In addition, the bottle preferably includes a relatively wide neck and coordinates with all suitable nipples and caps. In the context of the present invention, a suitable nipple is preferably fabricated from resilient silicone and the cap is fabricated from a food grade polypropylene (PP), polyethersulphone (PES), and/or polyphenylsulfone (PPSU) material. Polycarbonate and acrylic materials are also contemplated, as is "tempered glass", also known as safety glass, a glass that is strengthened through thermal or chemical treatment.

As noted above, the magnetic mixing system of the present invention is designed to accommodate virtually any conventionally sized and shaped and/or commercially available baby bottle. As for the storage vessel, virtually any conventional size or shape may be utilized, with both being largely a matter of design choice. For safety purposes, the base of the vessel, or at least its periphery, is relatively planar so as to ensure upright stability. However, in certain preferred embodiments, particularly those fabricated through blow molding, the base may include a convex center section. In either case, that base should be dimensioned to a diameter that nests within or coordinates with the aforementioned positioning component(s) of the stir plate.

Critically, the top opening of any suitable vessel must be wide enough to accept a coordinating magnetic stirring impeller. However, the remaining features of the vessel, whether baby bottle or storage container, are largely a matter of design. For example, the vessel may be optionally be provided exterior threads that mate with a corresponding nipple or lid. In the context of the storage container, any suitable lid may further include a flip-cap or sealed spout that allows for easy, splash-free dispensing.

Within the practice of the present invention, the phrase "magnetic stirring impeller" refers to a device that is adapted to and retained within the base of the vessel, preferably just above the bottom surface of the vessel so as to reduce noise and friction, and rotated within the horizontal plane via magnetic coupling to the magnetic stir plate's coupling magnets. In certain embodiments, the underside of the captive magnetic stirring impeller may be provided with integral boss or button that establishes a small clearance between the base of the vessel and the bottom of the impeller. In an alternate embodiment, the base of the vessel may be provided with a centrally disposed convex surface that serves the same purpose as the boss or button, namely to establish a clearance between the spinning "blades" of the impeller and the base of the vessel. In such instances, the impeller may be adapted to fit within yet rest upon an internal concave bottom portion of the bottle. To that end, as noted above, glass bottles are normally concave or have an arched structure to be stable on a flat surface; the impeller of the present invention is designed to adapt to and coordinate with this integral structure. Both configurations essentially eliminate friction, and thus friction-associated wear out, and further allow for the formation of a more effective and efficient vortex.

The overall size and shape of a preferred impeller can vary with the intended vessel. As such, the present invention contemplates kits that include multiple impellers of varying diameters, as needed. In either case, preferred embodiments preferably have a profile that mirrors that of the vessel. Accordingly, as most conventional baby bottles and storage containers have relatively curved or rounded periphery, the optimal impeller is likewise circular or ovoid, though other polygonal configurations are contemplated. In addition, so that they can be easily dropped into, employed, and removed from the vessel before and after use, it is preferable for the impeller to have a relatively flat, planar profile and further to have identical top and bottom profiles (i.e., symmetry about the horizontal axis) to facilitate rapid placement and employment regardless of top/bottom orientation. Finally, as vortex power and efficiency are directly proportional to the maximum dimension of the impeller, the "maximum diameter" of the impeller (i.e., a measurement designated as "d6" in FIGS. 5A and 6A) is smaller than the diameter of the vessel at the base.

For example, in a typical embodiment, the diameter of the impeller is on the order of approximately 44 mm whereas the diameter of the baby bottle is on the order of 55 mm and the diameter of a suitable storage vessel is on the order of 78 mm. In other preferred embodiments, the magnetic stirring impeller may be optimized to have a maximum diameter of between 30 and 50 mm, preferably between 35 and 45 mm, more preferably on the order of 40 mm. In addition, the magnetic stirring impeller is optimized to be relatively thin and planar, having an overall thickness of less than 25 mm, more preferably less than 12-13 mm, more preferably less than 5-10 mm, more preferably on the order of 5-7 mm. See, e.g., FIGS. 5B and 6B.

Figure 7A:
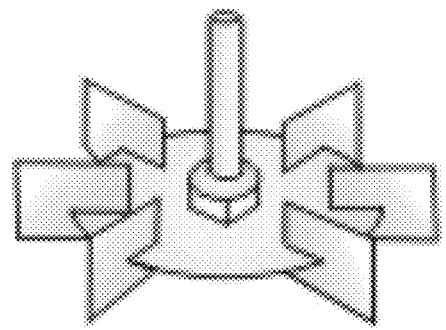
FIGS. 7A to 7C present various radial impeller configurations including the Rushton-type (FIG. 7A), the pitched blade type (FIG. 7B), and the hydrofoil type (FIG. 7C).
Figure 7B:
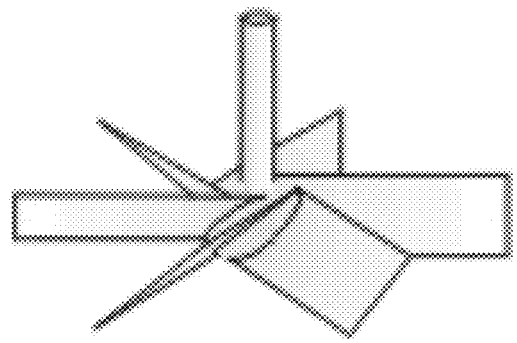
Figure 7C:
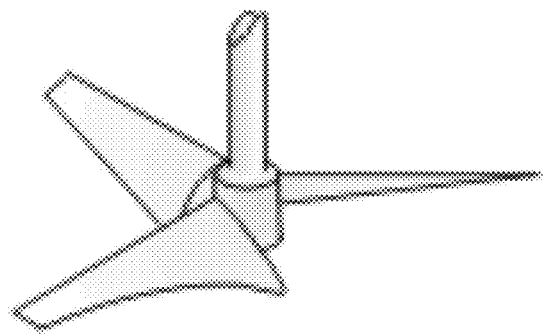

In terms of impeller design, the magnetic stirring impeller should be of a size and shape sufficient to give rise to a gentle vortex that allows for efficient and effective dissolution of the powdered material while minimizing negative events such as oxidation, foaming, and protein denaturation. Thus, through empirical testing, the present inventors have determined that a radial design analogous to the so-called "Rushton turbine" type is preferred (see FIG. 7A-7C). More particularly, an optimal magnetic stirring impeller optionally includes:

1. a central ring or annular component that acts to "seat" the impeller at the center of the base of the vessel;
2. a plurality of blades radiating from the center ring configured to generate the requisite gentle agitation for optimal PIF reconstitution; and
3. at least one concentric outer ring that serves to both stabilize and rigidify the impeller, particularly the blades, and to protect against breakage, warping and torsional deflection.

Particularly preferred designs are depicted in FIGS. 5A-5C and 6A-6C.

In the context of the present invention, the central ring is preferably provided with an open diameter (designated as "d7" in FIG. 5B), on the order of about 8 to 12 mm, preferably about 9 to 11 mm, more preferably about 10 mm, that is designed to accommodate any abnormalities that may be present in the (optionally convex) center of the bases of the vessel (i.e., manufacturing bumps). The central ring may be further optionally provided with an open chamfer on one or both sides, angled to a bevel on the order of about 110 to 130 degrees, preferably about 115 to 125 degrees, more preferably about 120 degrees, that serves to center the impeller so as to sit properly on the concave bottom of the vessel. See, e.g., FIGS. 5B and 6B.

Figure 5A:
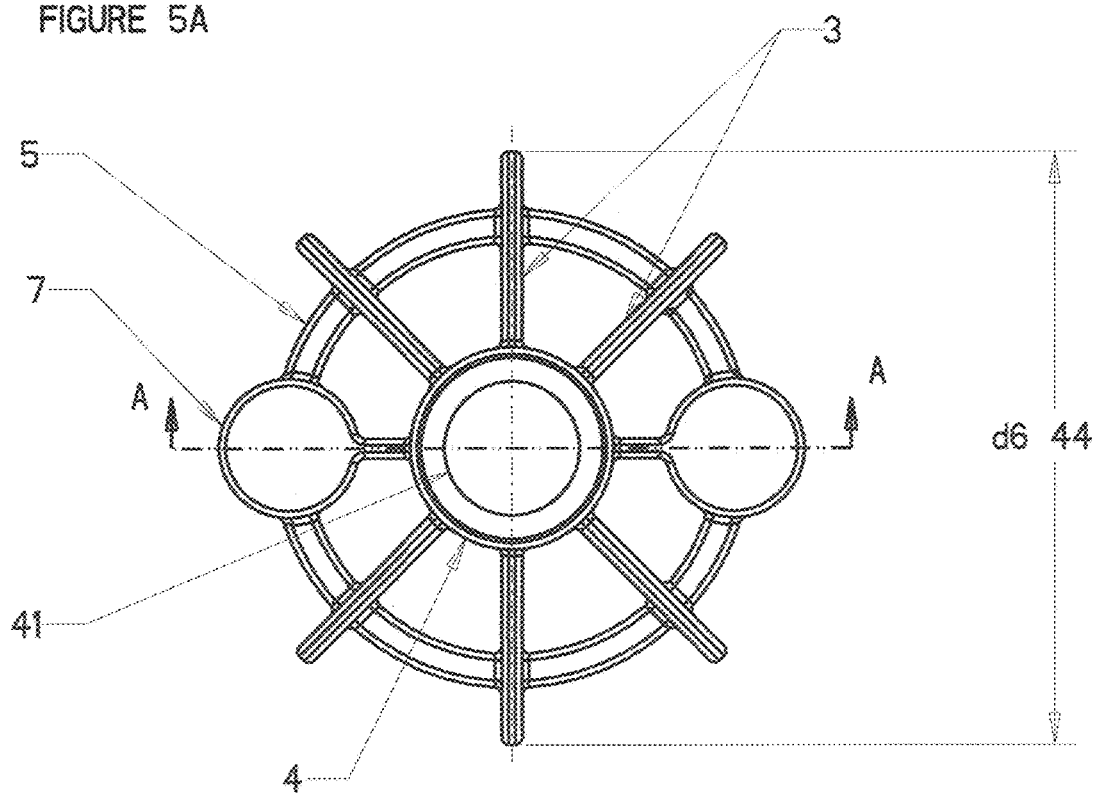
FIG. 5A is a top down section view of a magnetic stirring impeller of the present invention in isolation.
Figure 5B:
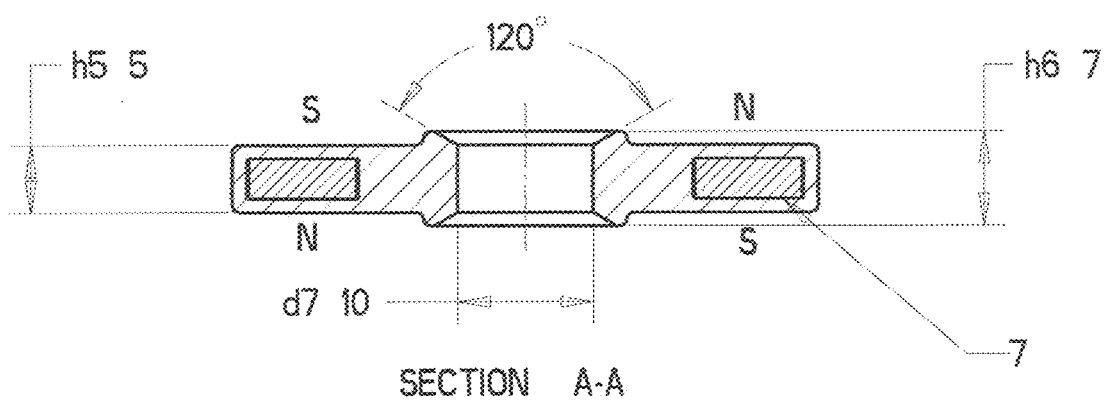
FIG. 5B is a cut-away side view of the magnetic stirring impeller depicted in FIG. 5A, along line A-A.
Figure 5C:
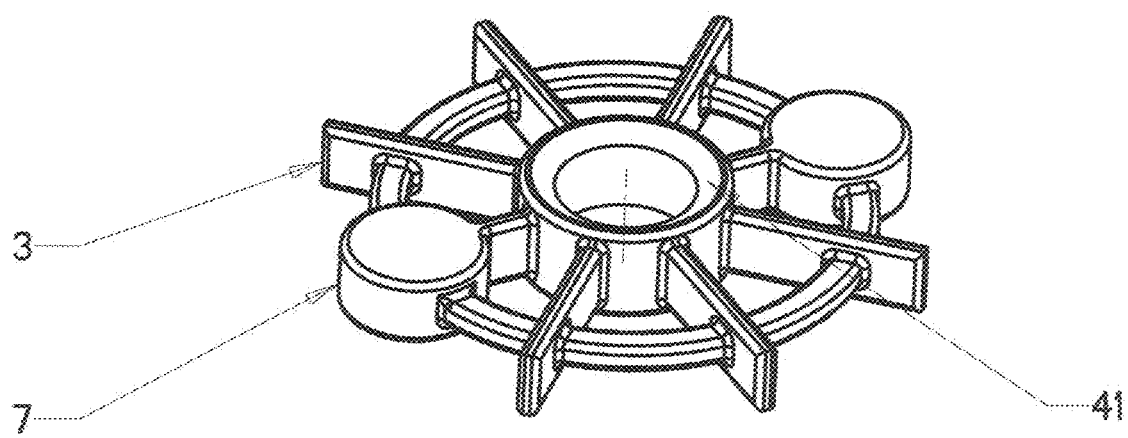
FIG. 5C is a perspective view of the magnetic stirring impeller depicted in FIG. 5A.
Figure 6A:
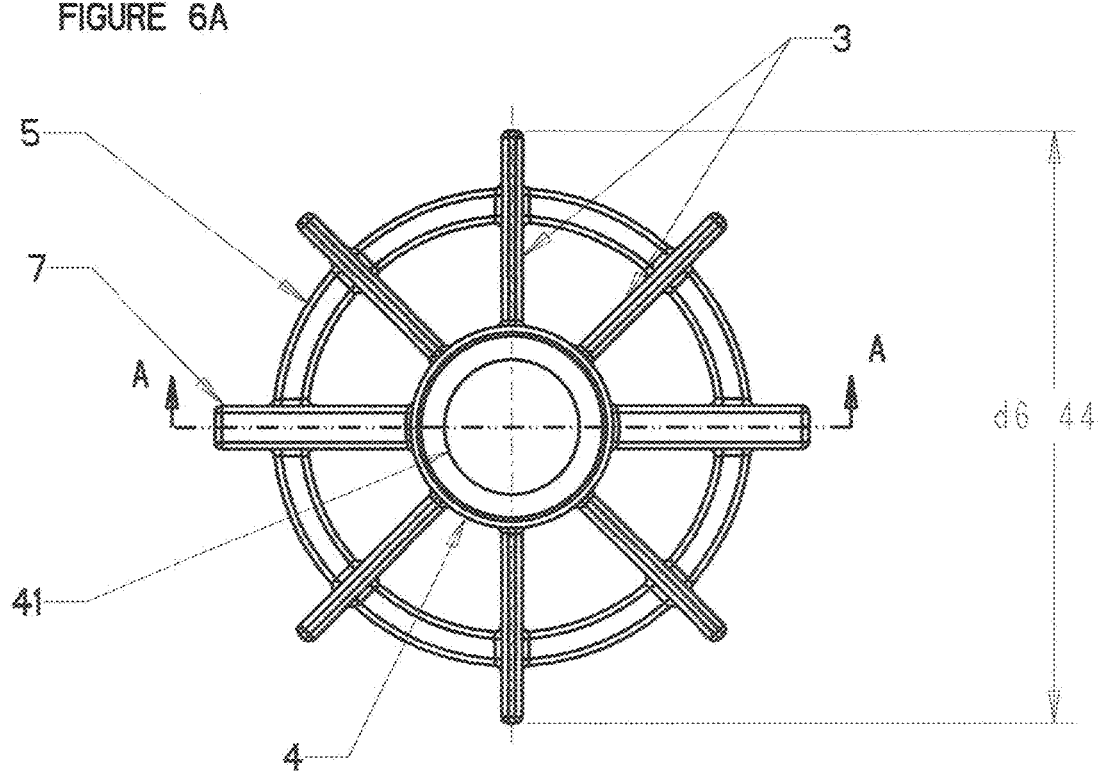
FIG. 6A is a top down view of an alternate embodiment of a magnetic stirring impeller of the present invention in isolation.
Figure 6B:
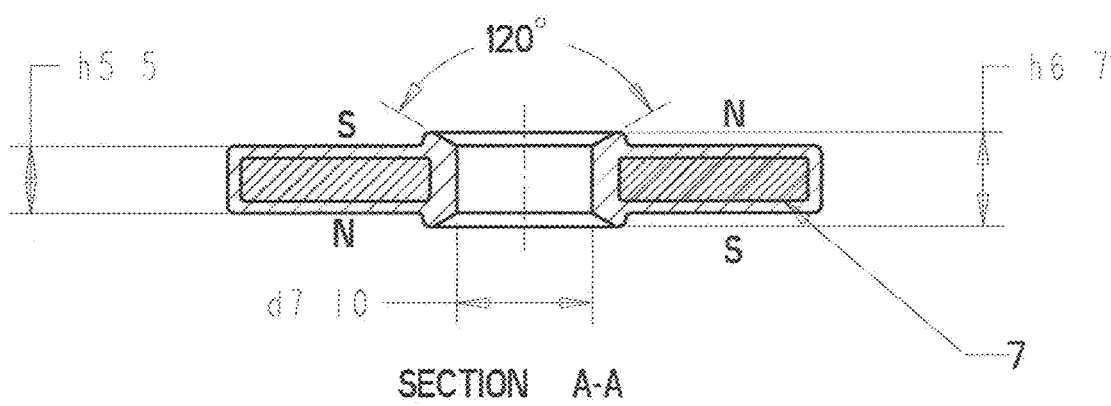
FIG. 6B is a cut-away side view of the magnetic stirring impeller depicted in FIG. 6A, along line A-A.
Figure 6C:
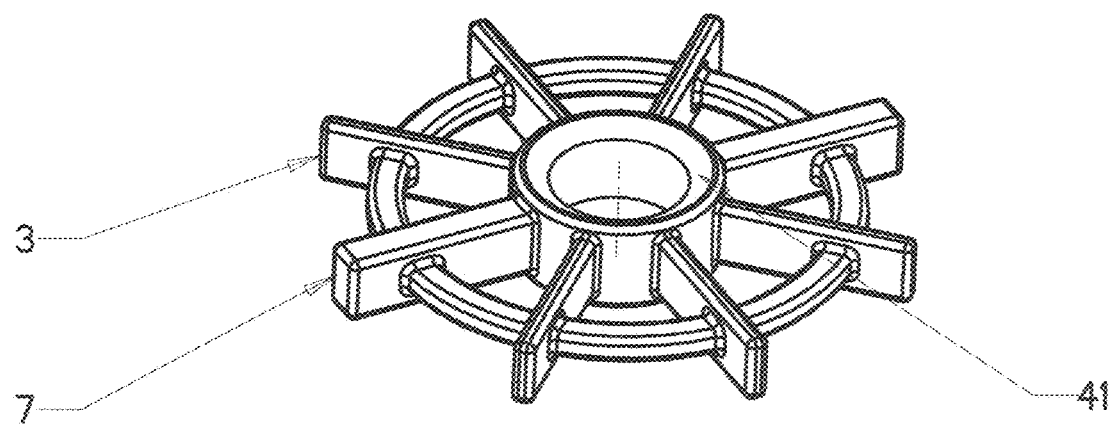
FIG. 6C is a perspective view of the magnetic stirring impeller depicted in FIG. 6B.

As depicted in FIGS. 5C and 6C, the impeller preferably includes a number of "blades" radially splayed about the central ring, preferably in a symmetrical fashion, like spokes on a wheel. The overall shape of each blade is largely a matter of design choice and thus may vary from straight to curved, from rectangular to arcuate, symmetrical to asymmetrical. In a similar fashion, the number of blades is largely a matter of design choice, though symmetrical and thus even numbers are preferred, optionally ranging from 2-10, more preferably 4-8, more preferably 6. Likewise, while the blades are depicted herein as normal to the plane defined by the impeller (i.e., a vertical or upright arrangement), the blades are pitched away from the vertical axis or even, +/−5 to 90 degrees, preferably 5 to 45 degrees, more preferably 5 to 30 degrees, more preferably 5 to 10 degrees.

In terms of dimensions, while the height and width of the blades is largely a matter of design choice, blade length is a critical factor in determining vortex efficiency. In a preferred embodiment, the ratio of blade span (i.e., a length measured from blade end to blade end, designated in FIG. 5A as approximately 44 mm) to the blade height is optimized to range from 8:1 to 4:1, more preferably around 6:1. For example, the blade height is preferably on the order of 10-20 mm, more preferably less than 12-13 mm, more preferably less than 5-10 mm, more preferably on the order of 5-7 mm (see, e.g., FIGS. 5B and 6B) while the blade span ranges from 30 to 100 mm, preferably 40 to 70 mm, more preferably on the order of 45 to 55 mm.

As noted above, the concentric outer ring serves to both stabilize and rigidify the blades of the impeller, ideally to protect against breakage, warping and torsional deflection. The blades may pass through or, alternatively, terminate at the outer ring. In addition, the invention contemplates the inclusion of more than one stabilizing ring.

In the context of the present invention, the magnetic stirring impeller is designed to carry or contain a magnetic, paramagnetic or ferromagnetic material to couple with the field of the coupling or drive magnets of the magnetic stir plate. In a preferred embodiment, ceramic or rare earth magnets are installed within the body of the magnetic mixing impeller. In a further preferred embodiment, two or more ceramic or rare earth magnets, for example fully magnetized Neodymimium (NdFeB) magnets, are encapsulated within the magnetic stirring impeller, for example, insert molded inside an injection molded impeller. For safety purposes, the magnets should be completely encapsulated with a minimum wall thickness of 1-2 mm all around.

In the context of the present invention, the paired magnets are preferably positioned on opposite sides of the central ring, evenly spaced and symmetrically aligned for balance purposes. While the precise size and shape of the magnets is largely a matter of design choice, rectangular bar magnets such as depicted in FIG. 6A are particularly preferred as they can then act as additional impeller blades. However, as noted in FIG. 5A, other shapes are contemplated.

The resultant magnetic fields of the magnet contained within the impeller optimally overlap with the magnetic fields of the magnetic stir plate's coupling magnets. In yet another embodiment, the two-impeller magnets within the captive magnetic stirring impeller have a vertical magnetic field vector sum. Thus, the impeller has two magnets wherein the summed magnetic field vectors of each magnet are vertical. Preferably, the summed magnetic field vectors of the two captive magnetic stirring impeller magnets are vertical and in opposing directions, namely up and down. This configuration optimizes the field overlap with the magnetic stir plates coupling magnets.

In the context of the present invention, the magnetic stirring impeller is preferably molded from a plastic or polymer material, more preferably one that is FDA approved for food use, has a low modulus of elasticity and a low coefficient of friction. For example, preferred polymers have a Young's modulus of less than 10, more preferably less than 1, more preferably less than 0.1 GPa. Particularly preferred are acetal homopolymers, such as those sold under the tradename Delrin®, that offer an excellent balance of properties to bridge the gap between metals and plastics. In particular, Ensinger's Delrin® 150, a homopolymer acetal manufactured using DuPont Delrin 150 Resin, possesses high tensile and flexural properties, along with creep resistance and toughness, while exhibiting low moisture absorption, and fatigue endurance.

As noted above, it is an objective of the present invention to provide for the automated preparation of an infant feed formulation reconstituted from powdered formula that overcomes the drawbacks of existing manual and automatic infant feed preparation systems and methods. Accordingly, a principal object of the present invention is to provide an improved acceleration and deceleration control system for a DC motor to optimize solubility while reducing and/or eliminating the damaging effects of foaming, denaturation, and oxidation of the reconstituted infant formulation. Accordingly, within the practice of the present invention, the phrase "acceleration and deceleration control system" refers to a specifically designed algorithm embedded into a microprocessor to automatically control the rate of speed of a DC motor housed in the stir plate component. While the selected algorithm may vary with the size of the vessel utilized and amount of infant feed formulation desired, a preferred algorithm will provide gentle, slow agitation as well as a gradual reduction thereof. For example, after much research and experimentation into foaming, denaturation, and oxidation analysis, the present inventors have determined that for preparation of a standard 8 ounce bottle of formula, a 3 minute sinusoidal algorithm such as depicted in FIG. 8A, one that employs very short, very gentle acceleration, followed by very gentle deceleration, will optimize mixing while minimizing foaming, oxidation and protein denaturation.

In a preferred embodiment, the control system utilized is a DC power of the electronic control systems. Thus, the magnetic stir plate is fitted with a DC power jack capable of receiving power from a low voltage DC power source. In a preferred embodiment, alternating current (AC) power is transformed to DC power from a wall-mounted transformer. In this embodiment, no AC power reaches the stir plate itself, thereby reducing the possibility and severity of electrical shock. However, in an alternate embodiment, the magnetic stir plate may be powered from an appropriate battery source.

In the preferred embodiment, a microcontroller is mounted to a PC board that is integrated into the magnetic stir plate. More particularly, a PC board is preferably attached inside the stir plate and held in place by appropriate housing components. In an illustrative embodiment such as depicted FIG. 9A, the PC board 29 includes a first connector 31 having a first set of pins (32, 33) for power input, for example that communicate with a 9V wall charger (not shown), and second set of pins (34, 35) for power output, for example that communicate with and power the DC motor 12; and a second connector 27 that connects with and charges the optional battery pack 16 as well as an optional temperature sensors (not shown). The microcontroller further includes means for communicating with an actuator mechanism, such as push button 14 and/or potentiometer knob 40 (see FIG. 1).

The microcontroller accepts data input from the linear speed control interface. The data is processed by the microcontroller and the appropriate action is taken according to the programmed commands. The preprogrammed microcontroller governs the action of the motor and as well as the display components. In an alternate embodiment, the microcontroller may be mounted on a PC board. One or more actuating mechanisms, such as a switch, lever, or push button, are preferably mounted to the front of the stir plate, along with appropriate display components, such an LED indicator (see, e.g., the green and blue LED lights depicted on the front of the device). For example, a blue or green light or LED indicator 13 may indicate power is "on" and may start blinking after a selected cycle completes (e.g., in 10 min). The red light 11 indicates when the battery needs recharge (see FIG. 1).

In the context of the present invention, the PC board is designed for both push button ("Push") and potentiometer ("POT") functioning. There are two programming codes for both Push and POT operations. In a preferred embodiment, a first microcontroller, for example a single-chip microcontroller in Atmel's megaAVR family, such as the Atmega 328p TQFP chip depicted in FIG. 9A as element 37, constitutes the main microcontroller for the circuit while a second microcontroller, for example an NiMH battery pack charging controller as exemplified by the DS2715 chip 36, is used for power management and battery charging.

In a preferred embodiment, the control system of the present invention is designed to address three major aspects, namely:

1. Speed Adjustment:

A PWM (Pulse Width Modulated) signal may be used to control the speed of the motor. This PWM signal may be generated by the microcontroller Atmega328 TQFP chip. The width of the pulse is directly proportional with the speed of the motor; so it can easily change the speed by varying the width of the pulse.

In a preferred embodiment of the present invention, the microcontroller chip has a Digital to Analog (DAC) converter section. In the context of the present invention, the DAC function is used to obtain the variable rotation speeds. This DAC output operates the power transistor that is in turn used to drive the motor.

Figure 9A:
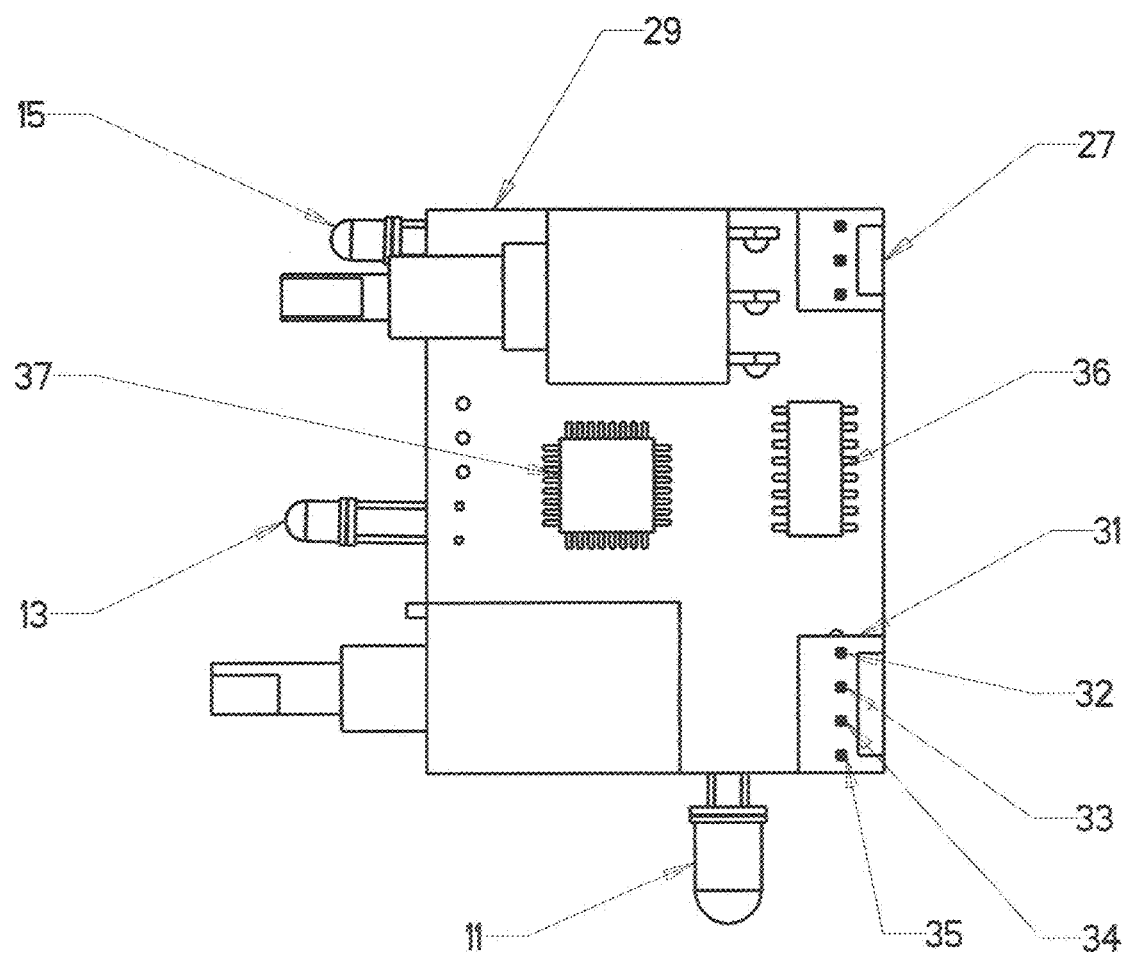
FIG. 9A is a schematic for an optional circuit board suitable for controlling the speed of the motor of the magnetic stirring system of the present invention.
Figure 9B:
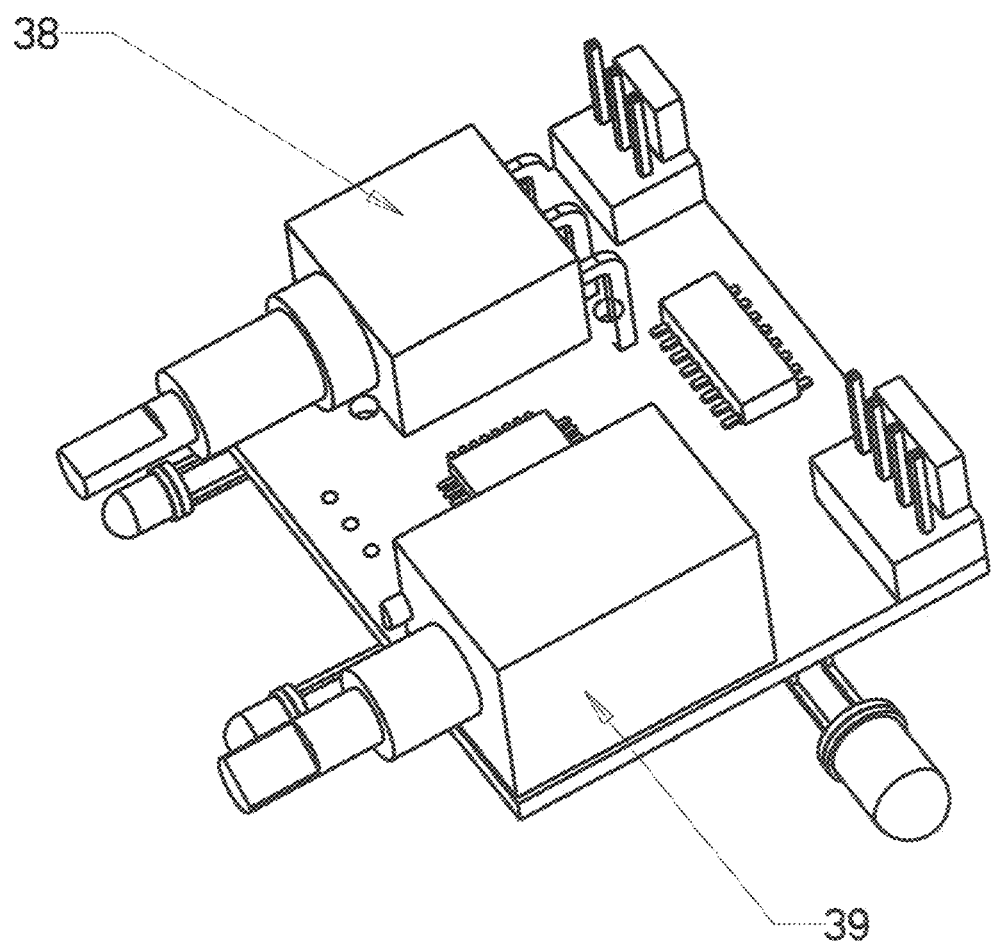
FIG. 9B depicts an alternate potentiometer and push button switch assembly that may be attached directly to the PC board.

2. Battery Charging Management System:

A DS2715 IC, such as depicted in FIG. 9A, element 37, may be used to manage the battery pack charging section of the circuit. The DS2715 is well suited for "smart" charge applications for NiMH cells. This chip is designed for reliable safe charging and it works as a switching charger. When the battery is fully charged, it is monitored by one of the contacts of the charger chip. In addition, a low battery level may be identified by measuring the voltage of the battery pack. This measurement is taken by a voltage divider part of the circuit. A user selectable charge timer allows charge rates from 0.167 C to 2 C. FAST-CHARGE, TOPOFF and DONE modes are included for the highly reliable, safe charging of NiMH cells.

3. Potentiometer or Push Button Controlling System:

In the context of a potentiometer circuit, there is an inbuilt power switch. By way of example, if the dial is rotated, for example counterclockwise, the circuit will be powered off. If the dial is turned to the right, for example, in a clockwise direction, the circuit is activated, the motor turns on and the LED flashes GREEN, indicating that the device is "in use". The speed of the motor can be changed according to the rotated angle of the POT. In the context of the present invention, after a pre-determined period of time has elapsed, for example a 6-12 minute, more preferably a 7-10 minute time period, the motor turns off automatically. Next, the LED may start to blink. Until the motor is started by rotating the POT, this LED will be blinking. If the battery is low, the LED, light element 6, will blink RED and will continue to blink until the charger is plugged in.

In the context of a push button circuit, there is no potentiometer to manually adjust the speed. Rather, the device is characterized by one or more pre-programmed time/speed/power profile(s), each of which may be optionally optimized for a particular volume of formula. For example, one may simply press the push button associated with a desired volume, at which point the motor will rotate according to a pre-determined time/speed/power profile, a sinusoidal example of which is depicted in FIG. 8A. As noted therein and elsewhere, the time/speed/power algorithm may be symmetrical or asymmetrical.

The push button controlling system automatically starts the program and the PWM output. The output signal is started with a low pulse and slowly and linearly increases the pulse width of the PWM signal until it reaches maximum speed. In one embodiment, such as depicted in FIG. 8A, this will happen within the first 90 seconds, optionally within the first minute. The pulse width represents the duty cycle of the pulse. In an 8-bit variable, the decimal value can be changed between 0 and 255, so pulse width can be change by assigning 0 to 255 values on the PWM variable.

In the push button embodiment, the LED function is similar to the POT.

Although any methods and materials similar or equivalent to those described herein can be used in the practice or testing of embodiments of the present invention, the preferred methods, devices, and materials are now described in greater detail by reference to the exemplary embodiments. However, the following examples only illustrate aspects of the invention and in no way are intended to limit the scope of the present invention. As such, embodiments similar or equivalent to those described herein can be used in the practice or testing of the present invention. For example, it should be understood that, although steps of various processes or methods may be shown and described as being in a sequence or temporal arrangement, the steps of any such processes or methods are not limited to being carried out in any particular sequence or arrangements, absent an express indication otherwise. Indeed, the steps in such processes or methods generally may be carried out in various different sequences and arrangements while still falling within the scope of the present invention.

In addition, any reference to advantages, benefits, unexpected results, or operability of the present invention are not intended as an affirmation that the invention has been previously reduced to practice or that any testing has been performed. Likewise, unless expressly stated otherwise, use of verbs in the past tense is not intended to indicate or imply that the invention has been previously reduced to practice or that any testing has been performed.

EXAMPLES

Figure 4A:
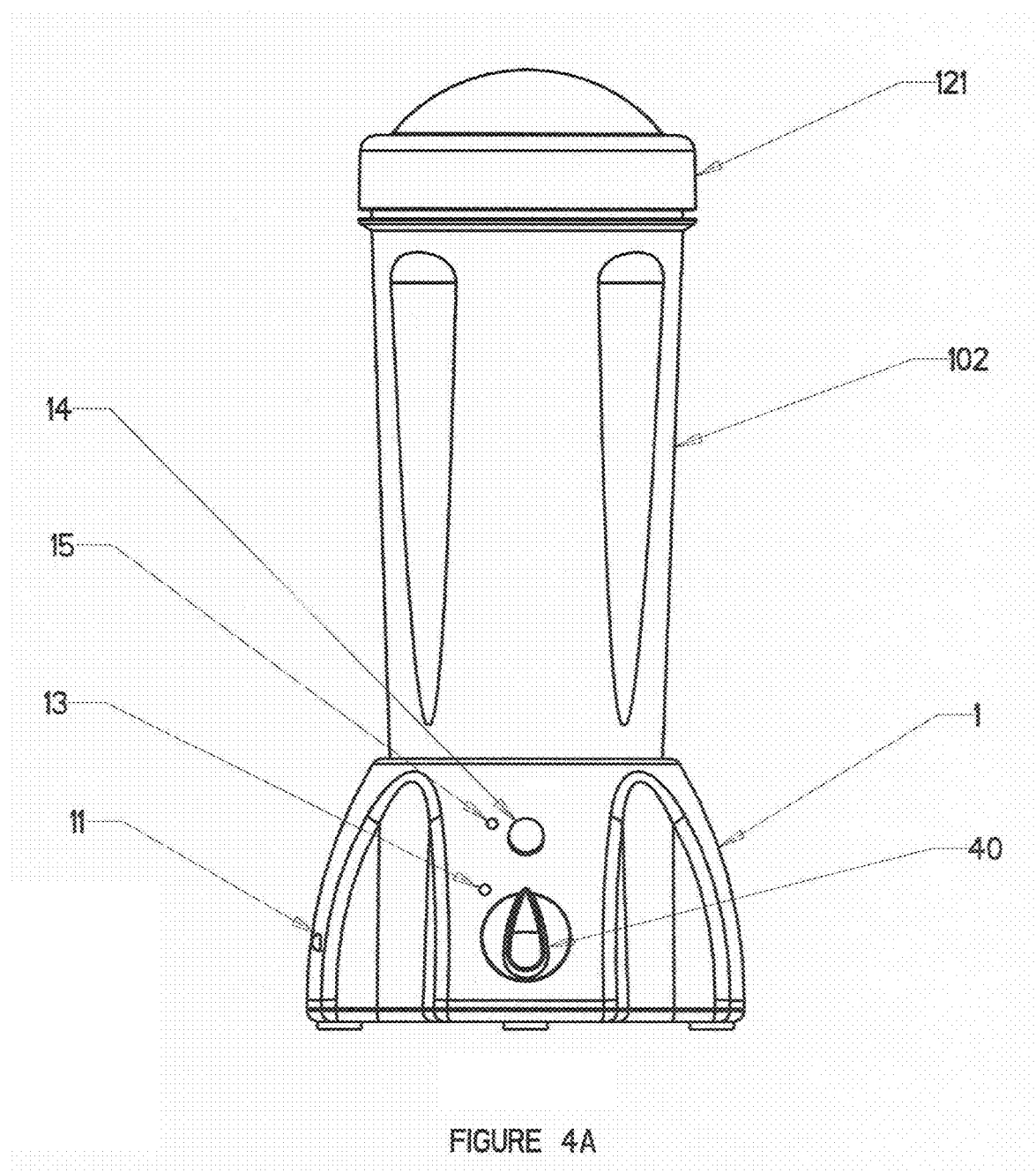
FIG. 4A is a front view of another illustrative embodiment of a magnetic stirring system of the present invention, namely a plastic vessel for preparation and storage of larger quantities of baby formula coupled with a magnetic stirring base unit identical to that depicted in FIG. 1.
Figure 4B:
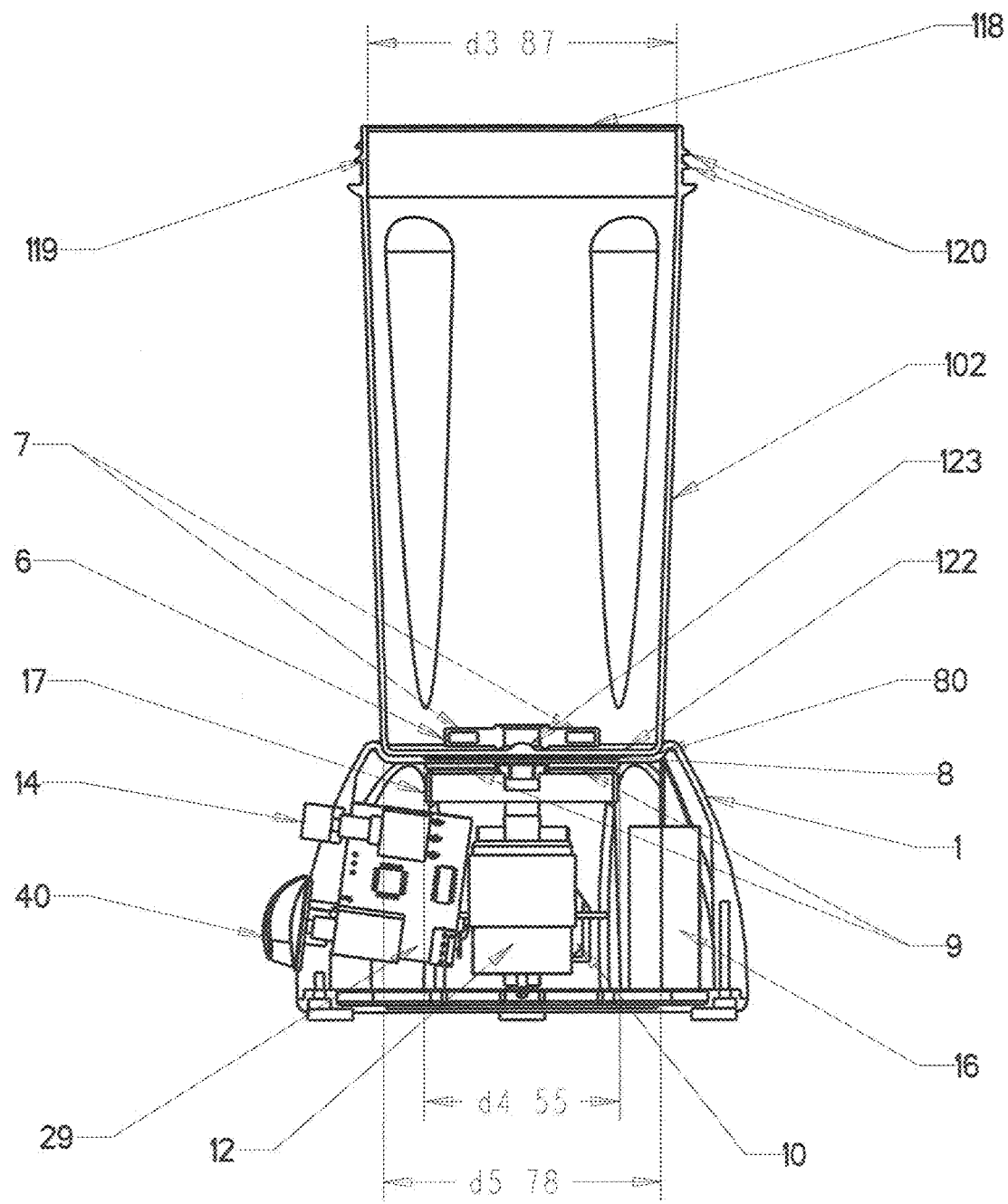
FIG. 4B is a cut-away right side view of the embodiment depicted in FIG. 4A.

Illustrative embodiments of the magnetic stirring system for the automated preparation of an infant feed formulation from powdered infant formulae is shown in FIGS. 1, 2, 4A, and 4B. The embodiment shown in FIGS. 1 and 2 includes: a magnetic stir plate 1, conventional baby bottle as stirring vessel 2, and a magnetic stirring impeller 6 having two opposingly positioned magnets 7 affixed thereto. In FIGS. 4A and 4B, the baby bottle is exchanged for a larger storage container 102. However, all other components remain the same.

Figure 3A:
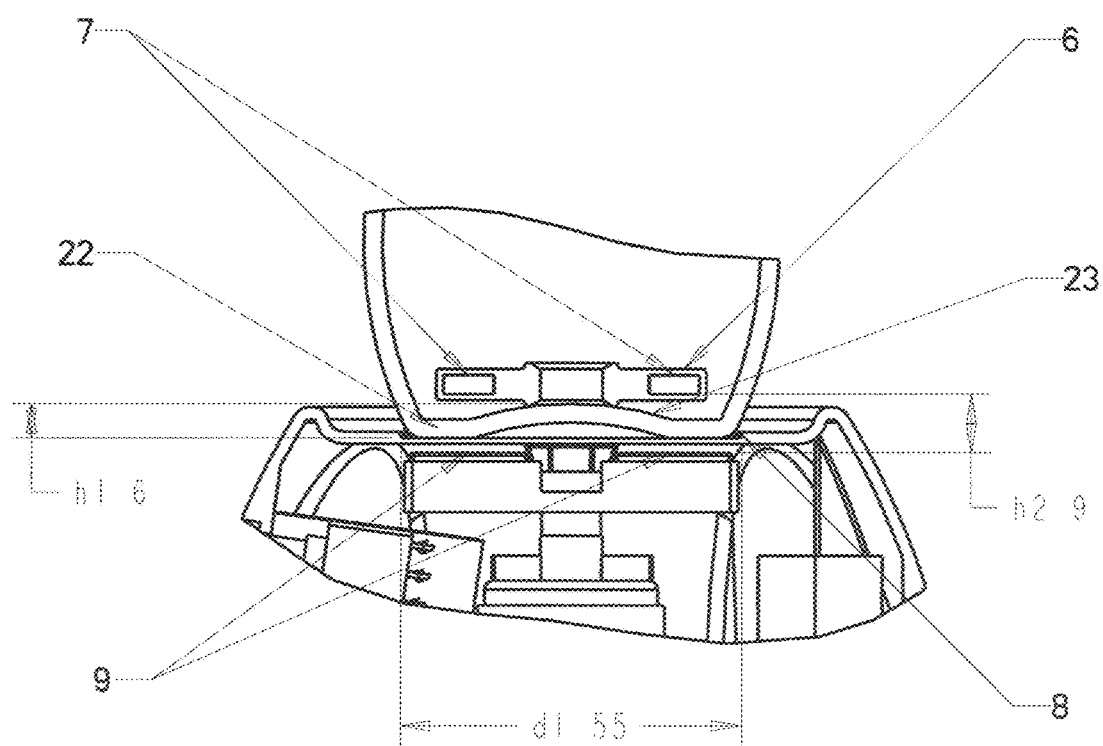
FIG. 3A is an expanded view of circled section of the same label identified in FIG. 2, depicting an enlarged (scale: 1.500×) cross-section view of the standard glass baby bottle coupled to the magnetic stirring base unit of FIG. 1 in which a magnetic stirring impeller of the present invention is adapted to the internal concave bottom of said bottle.
Figure 3B:
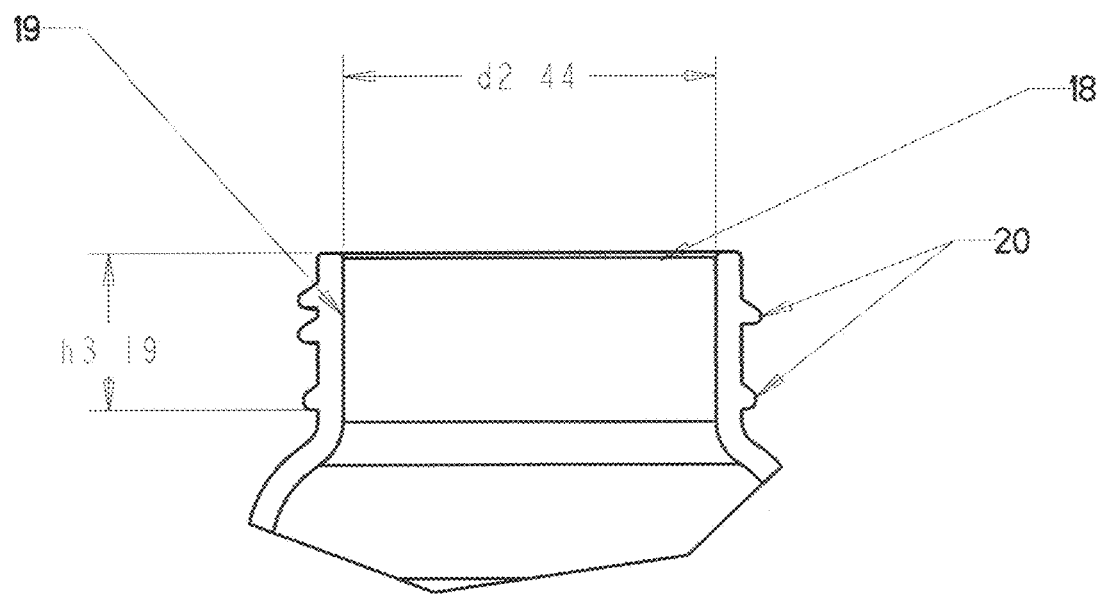
FIG. 3B is an expanded view of the circled section of the same label identified in FIG. 2, depicting an enlarged (scale: 1.500×) cross-section view of the threaded neck section of the standard glass baby bottle of FIG. 1 adapted to receive a coupling for a conventional bottle nipple.

Referring to FIGS. 1 and 3B, the baby bottle stirring vessel 2 is characterized by an open top or spout 18 of diameter "d2" (optionally about 44 mm), a neck portion 19 of height "h3" (optimally about 19 mm) provided with a series of exterior threads 20 designed to securely receive a correspondingly threaded nipple section 21, and a stable base 22 optionally provided with a convex center section 23. Expanded views of the base and neck portions are set forth in FIGS. 3A and 3B, respectively. As noted elsewhere, the magnetic stirring system of the present invention is adapted for use with virtually any conventional baby bottle. As such, additional and/or alternative features including, but not limited to, ergonomic hand and/or finger grips, grooved, ribbed, curved, and/or tapered sides and surfaces, and suitable volumetric markings, are likewise contemplated.

Figure 2:
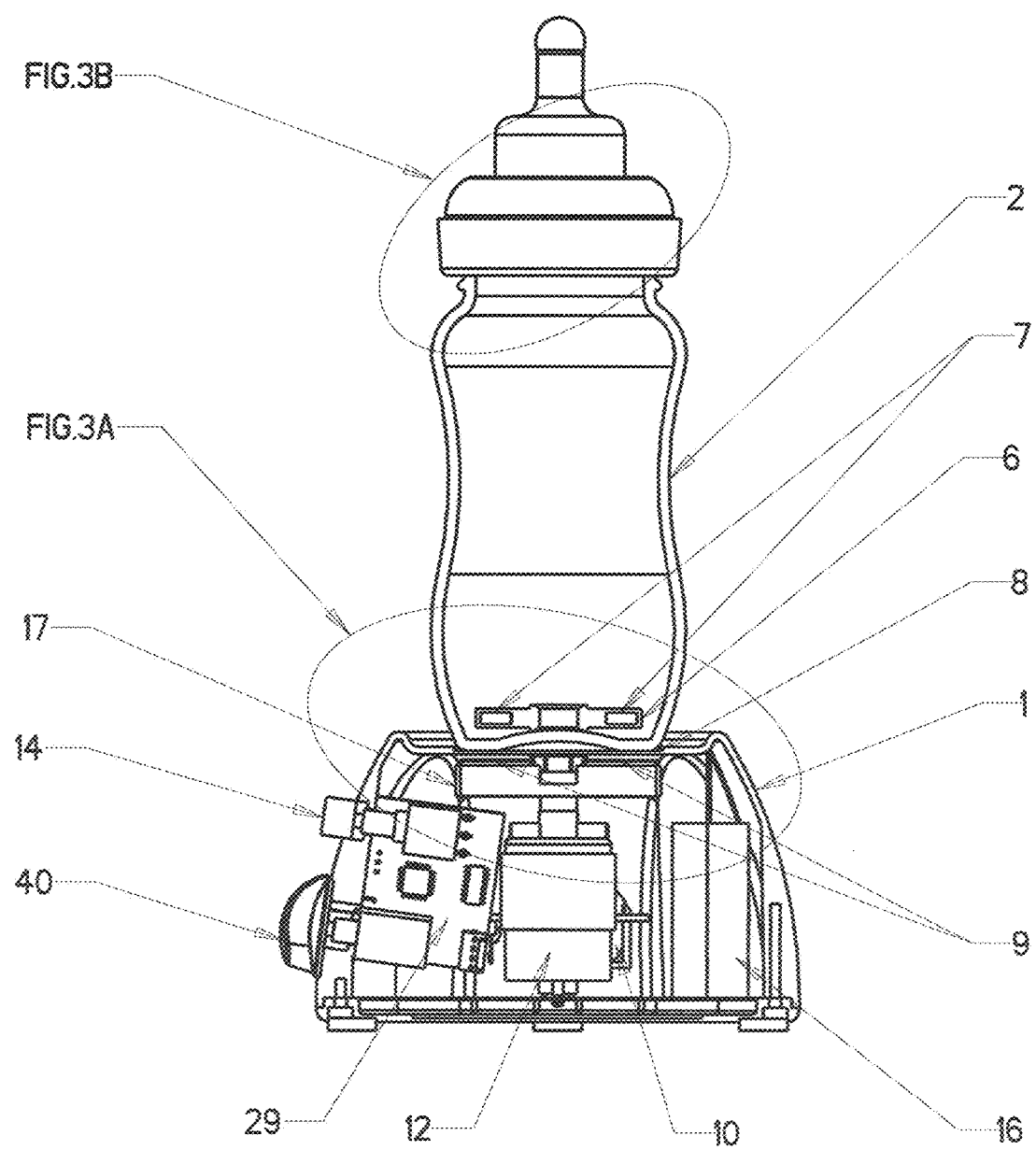
FIG. 2 is a cut-away right side view of the embodiment depicted in FIG. 1.

Referring to FIGS. 4A and 4B, like its counterpart in FIGS. 1 and 2, baby bottle 2, the storage container stirring vessel 102, is similarly characterized by an open top or spout 118 of diameter "d3" (optionally about 87 mm), a neck portion 119 provided with a series of exterior couplings or threads 120 designed to securely receive a correspondingly threaded top 121, and a stable base 122 optionally provided with a convex boss or button 123 disposed in the center. Like its counterpart, the storage vessel can likewise be provided with additional and/or alternative features including, but not limited to, ergonomic hand and/or finger grips, grooved, ribbed, curved, and/or tapered sides and surfaces, and suitable volumetric markings.

As discussed in greater detail above, the bottom of a glass baby bottle is characterized by convex center section 23 (or alternatively a convex boss of button 123) designed to coordinate with the upper or lower surface of a center ring component 4 of the magnetic stirring impeller 6, more particularly the chamfered surfaces thereof; see, e.g., element 41 of FIGS. 5B and 6B. In the embodiment depicted in FIG. 4B, the vessel 102 has a with a small diameter dimple 123 on which the impeller rotates above the bottom surface of the vessel, thereby reducing the friction and noise associated with traditional magnetic stir bars. In an alternate embodiment depicted in FIG. 3A, the requisite lower clearance is established by a convex section 23 on the vessel and thus the boss may be eliminated.

Referring to FIGS. 2 and 4B, the magnetic stir plate 1 has one or more recessed positioning elements 8 for baby glass bottle and 80 for storage vessel designed to align the vessel on the stir plate, thereby greatly improving the stability of the vessel. In addition, the positioning element assures the magnetic field overlap of the mixer's coupling magnets and the magnetic stirring impeller is thus optimized. For example, the stir plate may include an outer ridge of a first diameter designed to coordinate with the diameter of the large storage container and a second concentric ridge and/or groove of smaller diameter, designed to coordinate with the diameter of the baby bottle. The recessed positioning elements may be integrated into the top of the stir plate or alternatively be removable and/or provided separately, such as part of a kit. In either case, the coordinating vessel is designed to rest within the respective positioning element 8 of the stir plate, which, in turn, enables the vessel to be appropriately centered on the top surface of the stir plate.

The stir plate further houses a mounted PC board with a microcontroller 29. The speed control interface includes at least one software algorithm downloaded onto the microprocessor, a pushbutton control switch 14 for initiating a particular algorithm (e.g., a sinusoidal 3 minute algorithm associated with a 8 ounce bottle), an optional potentiometer dial 40 that allows for manual speed adjustment for larger capacity vessels, an optional blue LED light 15 or green LED light 13 that may blink or hold steady to indicate a cycle that is in progress and/or completed, an optional red LED light 11 that can indicate battery charge status and optionally blink when the battery is low. Two coupling magnets of opposite polarity 9 are aligned with two molded magnets of opposite polarity 7 into a stirring impeller to optimize magnetic schematic. The coupling magnets 9 are attached to the rotary iron bar 17 and are rotated in a horizontal plane by the DC motor 12. A DC power jack 10 can accept power from an AC wall mounted adapter (or other adapter such as a car adapter) or battery pack 16.

In the related embodiment, decoupling is greatly reduced through the acceleration ramp programmed into the microprocessor, which gradually winds-up the speed of the motor. When a stirring impeller rotates in the fluid, it generates a combination of flow and shear. The impeller generated flow can be calculated with the following equation:

$$Q=F1*N*D$$

Impeller Diameter, "D" is the maximum diameter swept around the axis of rotation. Rotational Speed, "N" is usually measured in (RPM). This variable refers to the rotational speed of the impeller.

The power required to rotate an impeller can be calculated using the following equation:

$$P=Pop*N3*D5-\text{Turbulent regime}$$

In both equations rotational speed "N" is a decisive factor in the transition from a fluid statics phase (liquid at rest) to gradually increasing liquid velocity and steering energy, thus greatly reducing a potential for magnetic decoupling.

The specifications may be optimized for the size and shape of the magnetic stirring impeller. A particularly preferred embodiment depicted in FIGS. 4A 4B, and 4C is suitable for use with blow-molded vessels characterized by a convex shape (23 or 123) at the center. In either case, the center ring 40 of the plastic injection-molded impeller 6 is designed to automatically align with the center line of the vessel, which, in turn, is aligned to the center of the magnetic stir plate (and thus the magnetic field established by the rotating iron bar(s) 17) by means of recessed positioning elements 8.

In the illustrative embodiments of FIGS. 5A-5C and 6A-6C, the magnetic stirring impeller is a relatively thin, relatively planar radial impeller having a thickness ranging from "h5" at the peripheral edge to "h6" at the annular center (i.e., 5 to 7 mm) and a diameter than is just slightly smaller than the vessel into which it is being placed, i.e., a diameter designed as "d6" (optimally 44 mm) vs. the diameter of the vessel designated as "d1" or "d3", depending on the embodiment (i.e., optimally ranging from 55 to 87 mm). In the illustrative embodiments depicted, the radial impeller is adapted to an internal concave bottom of the vessel of height "h1" (optimally on the order of 6 mm) such that the distance between impeller magnets 7 and drive magnets 9 is likewise optimized (generally about 10 mm). The radial impeller is furthermore preferably designed to have identical top and bottom surfaces so that it may be installed in either orientation.

With reference to the illustrative embodiments of FIGS. 5A-5C and 6A-6C, a radial impeller of the present invention is preferably constructed like a ship's wheel, including:

1. a central ring or annular component 4 that acts to "seat" the impeller at the center of the base of the vessel;
2. a plurality of blades 3 radiating from the center ring configured to generate the requisite gentle agitation for optimal PIF reconstitution; and
3. at least one concentric outer ring 5 that serves to both stabilize and rigidify the impeller, particularly the blades, and to protect against breakage, warping and torsional deflection.

Such a stirring impeller employs an "open" design and "radial" flow within a mixing vessel. A radial flow sucks in the liquid from axial directions and throws the fluid out in radial directions. In this manner, the impeller makes the entire liquid volume in the vessel swirl around as a homogenous body. The magnetic stirring impeller dimensions also affect the mixing capacity of the system. In turn, the optimal mixing speed is a function of the shape and size of the impeller.

For example, in a preferred embodiment, such as depicted in FIG. 6A-6C, the impeller has a maximum diameter or dimension (measured across, from blade tip to blade tip) on the order of 44 mm diameter and a thickness of about 5 to 7 mm. The dimensions of the magnetic stirring impeller work best with a magnetic stir plate capable of providing mixing speeds from zero revolutions per minute (rpm) to a maximum speed of 2400 rpm, more preferably on the order of 100 to 650 rpm. The magnetic impeller 6 is made from plastic Delrin® 500P. Delrin® (Acetal Homopolymer) is ideal for injection molding parts that require low friction and excellent dimensional stability. Delrin®, an acetal homopolymer resin that is a highly-crystalline engineering thermoplastic that industry leaders specify for high load mechanical applications, is also FDA approved for use in the food industry.

In a preferred embodiment of the magnetic stirring impeller such as shown in FIGS. 5A-5C and 6A-6C, the impeller is comprised of two rare earth NdFeB magnets with a grade of N40SH. The Maximum Energy Product is (BH)max=38-40 MGOe and the Maximum Operating Temperature is 300° F. This very high BHmax makes the magnets suitable to avoid any demagnetization during the insert injection molding manufacturing process with a temperature around 350° F. The magnets 7 may take different shapes. For example, the magnets may be round, such as shown in FIG. 5A, or rectangular as shown in FIG. 6A. As discussed above, the latter configuration is preferred as it essentially allows each magnet to serve as an additional radial blade to thereby enhance mixing.

FIG. 8A illustrates an illustrative acceleration/deceleration profile represented in a Cartesian coordinate system where the abscissa represents the time (T) in minutes and the ordinate is the acceleration voltage DC that is in turn a speed of the motor in RPM. As noted above, a sinusoidal path including a gentle acceleration period followed by an equally gentle deceleration period is particularly preferred.

The above examples are included to demonstrate preferred embodiments of the invention. It should be appreciated by those skilled in the art that the techniques disclosed in the example represent techniques discovered by the inventors to constitute preferred modes of practice. However, those skilled in the art should, in light of the present disclosure, appreciate that many changes can be made in the specific embodiments which are disclosed and still obtain a like or similar result without departing from the scope of the invention. For example, in the context of preferred embodiment, the algorithm may be generalized for use with a wide variety of powdered infant formula products or may alternatively be narrowly tailored to particular volumes and varieties. The accompanying actuating and display components may be readily adapted to reflect changes to and/or options afforded to the microcontroller by means of varying algorithms.

EMPIRICAL TESTING

The present invention relates to assemblies and systems for the reconstitution of dehydrated drinking products, more particularly infant formulations reconstituted from powdered formula. Such formulations are conventionally prepared either by stirring a solution with a spoon, or through shaking a baby bottle. However, stirring often falls short of complete mixing and shaking of formula can be unnecessarily aggressive. The present invention represents a third alternative, one that offers consumers measureable improvements over existing mixing products and methods, namely more thorough dissolution of solute, while reducing oxidation, foaming and denaturation. Hence, the resultant formulation is more palatable, more readily digested and the nutritional value is optimized.

The superiority of magnetic mixing to conventional methods and products for preparation of infant formulations can be objectively established. For example, one can measure the thoroughness of mixing using EPA protocol 340[1]. To that end, mixed products (standardized for a volume of 16 ounces and mixing time of 1 or 2 minutes) can be filtered and dried, and the resultant unmixed powered can be weighed. To measure foaming, and denaturation, both gravimetric and volumetric procedures can be conducted according to general procedures recommended by the EPA[2]. Namely, freshly mixed products (using standard volumes of 16 ounces and either 1 or 2 minutes of mixing) can be placed in volumetric flask and volumes of liquid and foam can be measured. After 30 minutes the liquid/emulsion interface can be measured to determine denaturation. Finally, the pH of the samples can be compared as a measure of oxidation, wherein lower pH values indicate the degree of oxidation. Such analyses were performed as follows:

Solubility Analysis:

A total of 16 ounces of Enfamil and Similac were prepared according to the manufacturer's recommendation. Samples were either stirred using a spoon in a glass vessel, shaken in a bottle or mixed with an automated magnetic mixer all for 1 minute. The product was passed through a Buchner funnel fitted with a pre-weighed coarse glass fiber filter paper. The paper containing the undissolved particulate matter was dried at 105° C., until the mass remained consistent for at least 10 minutes. The mass of the undissolved formula product was calculated and recorded in Tables 1A and 1B below.

TABLE 1A

Enfamil Solubility:

| | Exp # | Stir with Spoon | Shake in Bottle | Mixer |
|---|---|---|---|---|
| Enfamil | 1 | 0.19 | 0.03 | 0.03 |
| | 2 | 0.19 | 0.07 | 0.01 |
| | 3 | 0.17 | 0.05 | 0.02 |
| | Ave. grams | 0.18 | 0.05 | 0.02 |

[1] http://www.epa.gov/greatlakes/lmmb/methods/methd340.pdf
[2] http://www.epa.gov/ogwdw/methods/pdfs/manual_labcertification.pdf

TABLE 1B

Similac Solubility:

| | Exp. # | Stir with Spoon | Shake in Bottle | Mixer |
|---|---|---|---|---|
| Similac | 1 | 0.25 | 0.06 | 0.04 |
| | 2 | 0.22 | 0.05 | 0.04 |
| | 3 | 0.27 | 0.05 | 0.03 |
| | Ave. grams | 0.25 | 0.05 | 0.04 |

Figure 10:
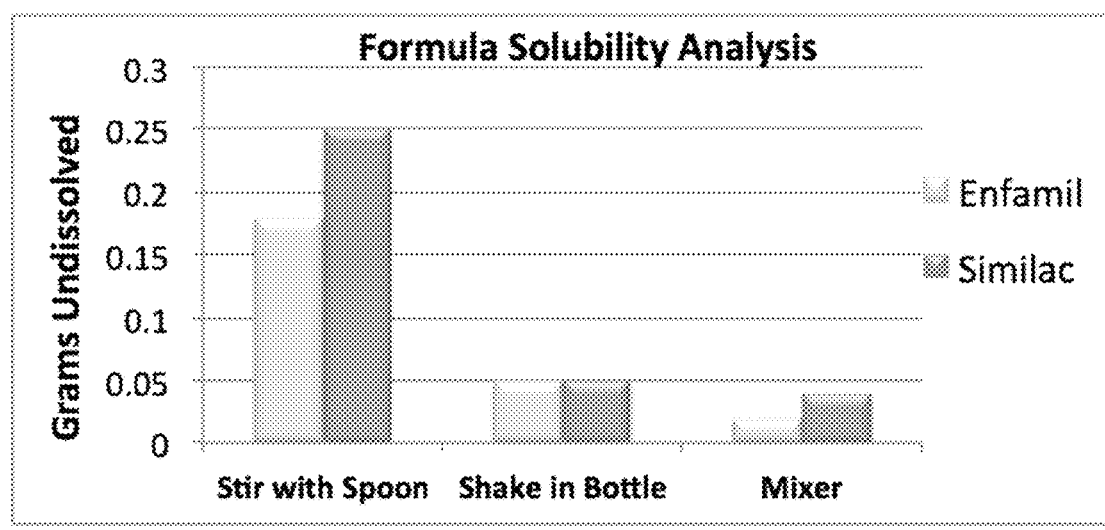
FIG. 10 is a bar graph depicting the results of the comparative solubility analyses set forth in Tables 1A and 1B of the Empirical Testing section.

The data set forth above and plotted together in FIG. 10 indicates that the automated mixing produces slightly better results than shaking, whereas stirring with a spoon left about 5 times more undissolved. Much of the undissolved formula for stirring was at the interface of the liquid/air at the top of the vessel. However, the relative amount of undissolved formula compared to the amount added was small in each case.

Foaming, Denaturation and Oxidation Analysis:

A total of 16 ounces of Enfamil and Similac were prepared according to the manufacturer's recommendation. Samples were either stirred using a spoon in a glass vessel, shaken in a bottle or mixed with an automated magnetic mixer all for 1 minute. The product was poured into a glass cylinder and the volume of liquid and foam was immediately recorded. The product was allowed to settle for 30 minutes, after which the liquid volume was re-measured. In some cases, a phase transition emulsion layer was observed and the volume was recorded as denatured product. Finally the pH of the mixture was recorded as a measure of oxidation due to increased acidity.

Figure 11:
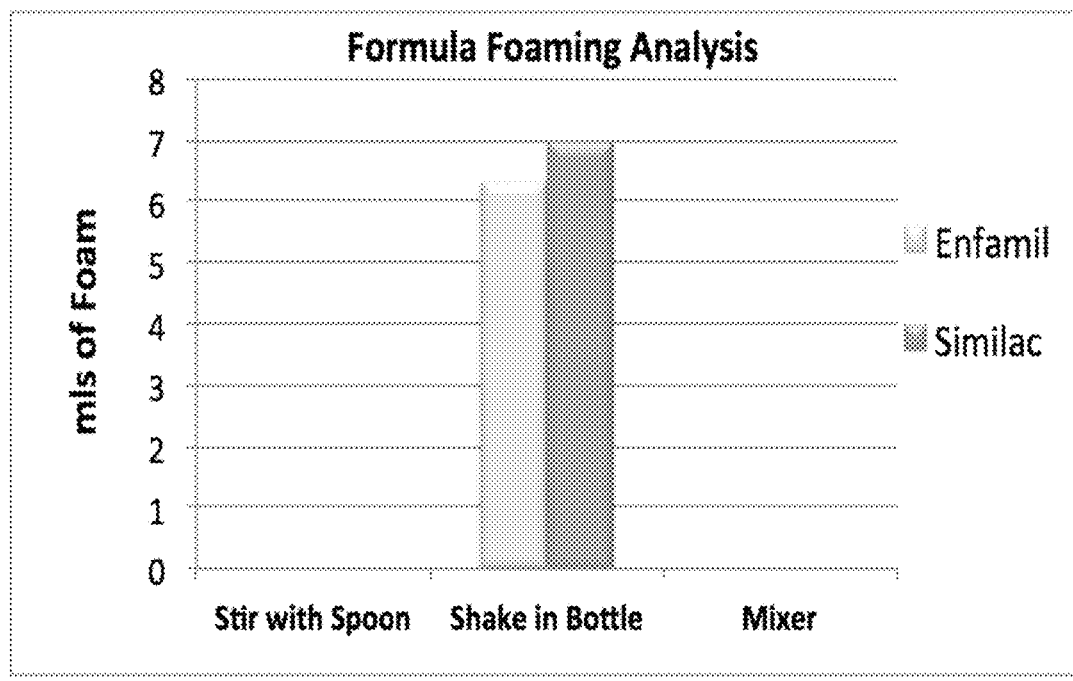
FIG. 11 is a bar graph depicting the results of the comparative foaming analyses set forth in Tables 2A and 2B of the Empirical Testing section.

Foaming:

As noted in Tables 2A and 2B below, the data for which is plotted together in FIG. 11, shaking the formula in a bottle resulted in some foaming (about 5% of the total volume), whereas stirring with a spoon or mixing with the invented mixer did not produce foam. It is worth noting that the foam generated from shaking dissipated within 5 minutes.

TABLE 2A

Enfamil Foaming:
Enfamil

| | Stir with Spoon | | Shake in Bottle | | Mixer | |
|---|---|---|---|---|---|---|
| Exp. # | Liquid | Foam | Liquid | Foam | Liquid | Foam |
| 1 | 152 | N/A | 149 | 5 | 153 | N/A |
| 2 | 150 | N/A | 149 | 6 | 155 | N/A |
| 3 | 153 | N/A | 149 | 8 | 150 | N/A |
| Ave. mls | 151.67 | 0 | 148.33 | 6.33 | 152.67 | 0 |

TABLE 2B

Similac Foaming:
Similac

| | Stir with Spoon | | Shake in Bottle | | Mixer | |
|---|---|---|---|---|---|---|
| Exp. # | Liquid | Foam | Liquid | Foam | Liquid | Foam |
| 1 | 150 | N/A | 148 | 7 | 151 | N/A |
| 2 | 150 | N/A | 146 | 5 | 152 | N/A |
| 3 | 149 | N/A | 147 | 9 | 151 | N/A |
| Ave. mls | 149.67 | 0 | 147.00 | 7.00 | 151.33 | 0 |

Figure 12:
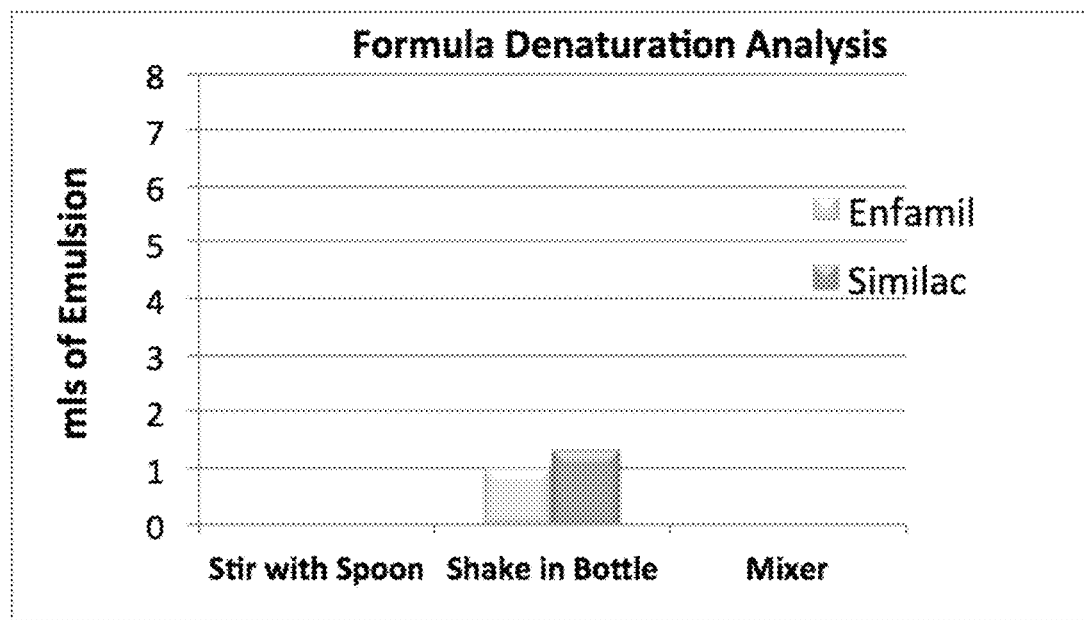
FIG. 12 is a bar graph depicting the results of the comparative denaturation analyses set forth in Tables 3A and 3B of the Empirical Testing section.

Denaturation:

As noted in Tables 3A and 3B below, the data for which is plotted together in FIG. 12, no emulsion was observed with stirring or with an automated magnetic mixer. However a slight film was observed on the surface of the liquid layer for samples that were shaken, which is indicative of denaturation.

TABLE 3A

Enfamil Denaturation:
Enfamil

| | Stir with Spoon | | Shake in Bottle | | Mixer | |
|---|---|---|---|---|---|---|
| Exp. # | Liquid | Emulsion | Liquid | Emulsion | Liquid | Emulsion |
| 1 | 152 | N/A | 150 | 5 | 152 | N/A |
| 2 | 153 | N/A | 150 | 6 | 154 | N/A |
| 3 | 153 | N/A | 149 | 8 | 151 | N/A |
| Ave. mls | 152.33 | N/A | 149.67 | 6.33 | 152.33 | N/A |

TABLE 3B

Similac Denaturation:
Similac

| | Stir with Spoon | | Shake in Bottle | | Mixer | |
|---|---|---|---|---|---|---|
| Exp. # | Liquid | Emulsion | Liquid | Emulsion | Liquid | Emulsion |
| 1 | 151 | N/A | 149 | 1 | 151 | N/A |
| 2 | 150 | N/A | 148 | 2 | 152 | N/A |
| 3 | 152 | N/A | 148 | 1 | 150 | N/A |
| Ave. mls | 151.00 | N/A | 148.33 | 1.33 | 151.00 | N/A |

Figure 13:
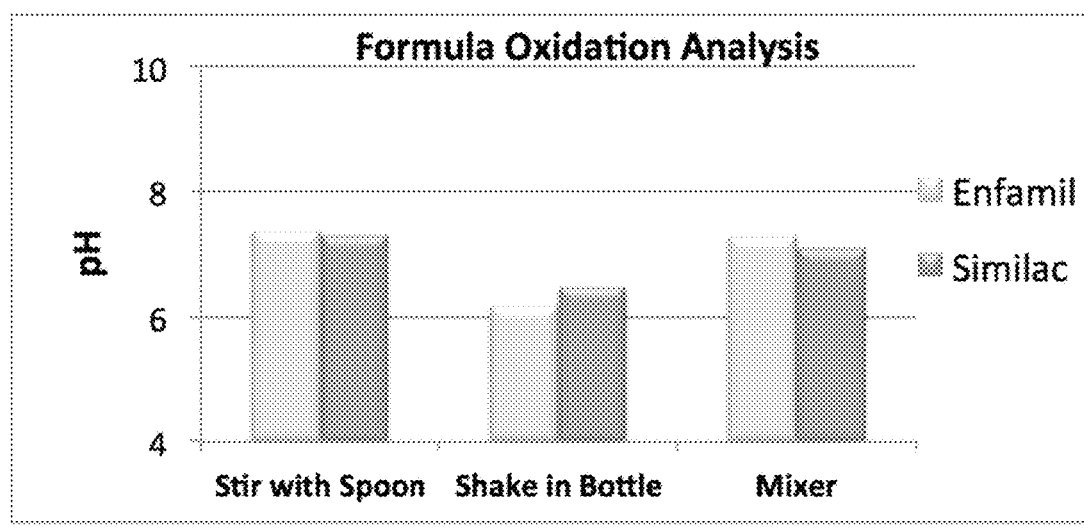
FIG. 13 is a bar graph depicting the results of the comparative oxidation analyses set forth in Tables 4A and 4B of the Empirical Testing section.

Oxidation:

As noted in Tables 4A and 4B below, the data for which is plotted together in FIG. 13, a slight reduction in pH was observed when formula was shaken. This suggests that when air was introduced into the system (supported by the foaming data) the formula is oxidized.

TABLE 4A

Enfamil Oxidation:

| | Exp # | Stir with Spoon | Shake in Bottle | Mixer |
|---|---|---|---|---|
| Enfamil | 1 | 7.4 | 6.4 | 7.3 |
| | 2 | 7.4 | 6 | 7.4 |
| | 3 | 7.3 | 6.1 | 7.2 |
| | Ave. pH | 7.37 | 6.17 | 7.30 |

TABLE 1B

| | Exp. # | Stir with Spoon | Shake in Bottle | Mixer |
|---|---|---|---|---|
| Similac | 1 | 7.2 | 6.1 | 7 |
| | 2 | 7.5 | 6.9 | 7.2 |
| | 3 | 7.2 | 6.4 | 7.1 |
| | Ave. pH | 7.30 | 6.47 | 7.10 |

Similac Oxidation:

CONCLUSION

Shaking in a bottle or mixing with an automated magnetic mixer resulted in better solubility when compared with stirring. However, shaking resulted in foaming, denaturation and oxidation, whereas stirring or mixing with an automated magnetic mixer did not. Hence, only the automated magnetic mixer optimized solubility while eliminating damaging effect on the formula observed as foaming, denaturation and oxidation. Thus, the inventive mixer optimizes reconstitution of powdered infant formula while maintaining the nutritional value and integrity of the final formulation.

INDUSTRIAL APPLICABILITY

As noted above, there is a need in the art for a system for automating the consistent preparation of homogeneous infant feed formulations reconstituted from powdered infant formulae. The magnetic mixer system of the present invention, in which a distinctive radial impeller is coupled with a precise mixing algorithm specifically adapted for infant formula reconstitution, maximizes efficient solubilization while minimizing negative side effects such as oxidation, foaming, and protein denaturation. Although described in detail with respect to vessels and impellers of a particular size and shape, it will be readily apparent to the skilled artisan that the utility of the present invention extends to other embodiments.

The disclosure of each publication, patent or patent application mentioned in this specification is specifically incorporated by reference herein in its entirety. However, nothing herein is to be construed as an admission that the invention is not entitled to antedate such disclosure by virtue of prior invention.

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. Such other advantages and features will become apparent from the claims filed hereafter, with the scope of such claims to be determined by their reasonable equivalents, as would be understood by those skilled in the art. Thus, the invention is defined not by the above description, but by the following claims and their equivalents.

What is claimed:

1. An integrated magnetic stirring assembly for the reconstitution of powdered infant formulations, said assembly comprising:
   a. a vessel having an upper portion that includes an open spout in communication with a hollow interior, an intermediate body portion that defines a longitudinal axis, and a lower base portion characterized by a relatively flat or planar stable bottom surface;
   b. a magnetic stirring impeller retained within said hollow interior, at or near said bottom surface, characterized by:
      i. an annular support section,
      ii. a plurality of transversely-extending blades radiating out from said support section, and
      iii. two opposed, laterally spaced magnet components that together define a first vertical summed magnetic field vector, wherein said magnet components symmetrically arranged about said annular support section and fabricated of magnetic, paramagnetic or ferromagnetic material;
   wherein the diameter of the magnetic stirring impeller is slightly smaller than the diameter of the vessel measured at said bottom surface,
   further wherein said magnetic stirring impeller is introduced into the hollow interior via said open spout and subsequently centered about the bottom surface of said vessel such that said plurality of transversely-extending blades can freely spin within said lower base portion without contacting any surface of said vessel.

2. The integrated magnetic stirring assembly according to claim 1, wherein said vessel is blow molded from a glass, polycarbonate, acrylic, and/or tempered glass material.

3. The integrated magnetic stirring assembly according to claim 2, wherein said vessel comprises a baby bottle.

4. The integrated magnetic stirring assembly according to claim 1, wherein said vessel stirring impeller is injection molded from a plastic or polymeric material that is suitable for food use, has a low modulus of elasticity, and a low coefficient of friction.

5. The integrated magnetic stirring assembly according to claim 4, wherein said vessel comprises a fluid-tight container adapted for storing multiple servings of reconstituted powdered infant formulation.

6. The integrated magnetic stirring assembly according to claim 1, wherein the bottom surface of said vessel is characterized by a convex center portion or dimple, further wherein the annular support section of said stirring impeller is aligned with and rests upon said dimple or convex portion.

7. The integrated magnetic stirring assembly according to claim 6, wherein the annular support section of said stirring impeller is characterized by top and bottom sides and a cylindrical periphery, further wherein one or both of said top and bottom sides of said annular support section are include a chamfered or beveled surface that serves to center the magnetic stirring impeller on said dimple or convex portion.

8. The integrated magnetic stirring assembly according to claim 1, wherein the magnetic stirring impeller comprises 4, 6 or 8 blades.

9. The integrated magnetic stirring assembly according to claim 1, wherein said plurality blade components are normal to the plane defined by said annular support section.

10. The integrated magnetic stirring assembly according to claim 1, wherein said blade components are pitched at an acute angle relative to the plane defined by said annular support section.

11. The integrated magnetic stirring assembly according to claim 1, wherein the ratio of the blade span to the blade height ranges from 8:1 to 4:1.

12. The integrated magnetic stirring system according to claim 1, wherein said magnetic stirring impeller further comprises an outer stabilizing ring concentrically disposed about said annular support section, wherein said plurality of transversely-extending radial blades intersect with said outer ring.

13. The integrated magnetic stirring assembly according to claim 1, wherein said magnetic stirring impeller has a relatively flat, planar profile and relatively circular periphery.

14. The integrated magnetic stirring assembly according to claim 1, wherein said magnetic stirring impeller has an overall thickness of about 5 to 25 mm and an overall diameter of about 30 to 50 mm.

15. The integrated magnetic stirring assembly according to claim 1, wherein each magnet component is insert molded within a respective blade so as to be completely encapsulated within said magnetic stirring impeller, with a minimum wall thickness of 1-2 mm all around.

16. The integrated magnetic stirring assembly according to claim 15, wherein each magnet component comprises a ceramic or rare earth magnet.

17. The integrated magnetic stirring assembly according to claim 15, wherein each magnet component comprises a fully magnetized Neodymimium (NdFeB) magnet.

18. The integrated magnetic stirring assembly according to claim 15, wherein each magnet component comprises a rectangular bar magnet housed within an analogously sixed and shaped rectangular blade.

19. An automated magnetic mixing system for reconstituting powdered infant formulations, said system comprising the integrated magnetic stirring assembly of claim 1 coupled with a magnetic stir plate, wherein said magnetic stir plate comprises:
   a. a housing containing a DC motor driven by a DC power source via an associated power transistor, wherein said DC motor drives a horizontally disposed rotor bar and is activated by an actuator mechanism disposed on the exterior of said housing;
   b. a PC board integrated with said housing that includes a pre-programmed microcontroller for regulating the acceleration and deceleration of said DC motor in response to said actuator mechanism;
   c. a pair of coupling magnets of opposite polarity attached to said rotor bar, wherein activation of said motor causes said coupling magnets to rotate in a horizontal plan and define a second vertical summed magnetic field vector; and
   d. one or more recessed positioning elements disposed about the periphery of the top surface of said housing that are sized to mate with the base of said stirring vessel and align the center of the stirring impeller with the center of the stir plate and thus align said coupling magnets and with said impeller magnets, such that said first vertical summed magnetic field vector overlaps with said second vertical summed magnetic field vector.

20. The automated magnetic mixing system according to claim 19, wherein the microcontroller includes one or more pre-programmed acceleration/deceleration time/speed profiles.

21. The automated magnetic mixing system according to claim 20, wherein the pre-programmed microcontroller generates a select pulse width modulated (PWM) signal that controls the speed of said motor in accordance with a selected speed profile.

22. The automated magnetic mixing system according to claim 21, wherein the speed profile dictated by said PWM signal is symmetric.

23. The automated magnetic mixing system according to claim 20, wherein the acceleration/deceleration cycle comprises a three minute sine curve having a maximum speed of 650 rpm.

24. The automated magnetic mixing system according to claim 20, wherein said pre-programmed microcontroller is associated with a visual display.

25. The automated magnetic mixing system according to claim 24, wherein said actuator mechanism is a push button control switch and said visual display comprises one or more LEDs.

26. The automated magnetic mixing system according to claim 25, wherein activation of said push button control switch automatically activates said microcontroller and said associated program and PWM output.

27. The automated magnetic mixing system according to claim 20, wherein said pre-programmed microcontroller includes a Digital to Analog (DAC) converter function that is used to obtain variable rotation speeds, wherein DAC output operates said power transistor that in turn drives said motor.

28. The automated magnetic mixing system according to claim 19, wherein said PC board further comprises a smart charge microcontroller.

29. The automated magnetic mixing system according to claim 19, wherein said rotor bar comprises an iron and plastic assembly that is attached to a motor shaft that is driven by said motor.

30. The automated magnetic mixing system according to claim 19, wherein said DC power source comprises a low voltage DC power source transmitted through a DC power jack.

31. The automated magnetic mixing system according to claim 19, wherein said DC power source comprises an alternating current (AC) transformed to DC power from a wall-mounted transformer.

32. The automated magnetic mixing system according to claim 19, wherein said DC power source comprises a rechargeable battery that may be optionally integrated with said housing.

* * * * *